United States Patent
Tsuji et al.

(10) Patent No.: US 7,608,340 B2
(45) Date of Patent: Oct. 27, 2009

(54) OXYGEN ABSORPTION RESIN COMPOSITION

(75) Inventors: Yoshihisa Tsuji, Kurashiki (JP); Mie Kodani, Kurashiki (JP); Tomoyuki Watanabe, Kurashiki (JP); Hideharu Iwasaki, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 76 days.

(21) Appl. No.: 10/997,867

(22) Filed: Nov. 29, 2004

(65) Prior Publication Data

US 2005/0153087 A1    Jul. 14, 2005

(30) Foreign Application Priority Data

Dec. 3, 2003  (JP)  .............. 2003-403951

(51) Int. Cl.
  *B32B 27/00*  (2006.01)
(52) U.S. Cl. ............... 428/500; 428/521; 524/398; 524/401; 524/413; 524/503
(58) Field of Classification Search ........... 524/394, 524/398, 401, 413, 503; 428/500, 521
  See application file for complete search history.

(56) References Cited

U.S. PATENT DOCUMENTS

| | | | | |
|---|---|---|---|---|
| 3,935,160 A | * | 1/1976 | Kline | .......... 524/248 |
| 5,648,020 A | | 7/1997 | Speer et al. | |
| 6,004,477 A | * | 12/1999 | Nakagawa et al. | ..... 252/188.28 |
| 6,254,946 B1 | | 7/2001 | Hirata et al. | |
| 6,599,598 B1 | | 7/2003 | Tai et al. | |
| 2003/0018114 A1 | | 1/2003 | Tai et al. | |
| 2006/0281882 A1 | | 12/2006 | Tsuji et al. | |

FOREIGN PATENT DOCUMENTS

| | | |
|---|---|---|
| CA | 2 313 399 | 1/2001 |
| CA | 2 389 434 | 3/2002 |
| EP | 0 507 207 A2 | 10/1992 |
| EP | 1 033 080 A2 | 9/2000 |
| EP | 1 314 761 A1 | 5/2003 |
| JP | 5-115776 | 5/1993 |
| JP | 11-70331 | 3/1999 |
| JP | 2000-319408 | 11/2000 |
| JP | 2001-106866 | 4/2001 |
| JP | 2001-106920 | 4/2001 |
| JP | 2002-146217 | 5/2002 |
| WO | WO 02/072695 A1 | 9/2002 |

OTHER PUBLICATIONS

U.S. Appl. No. 12/439,844, filed Mar. 4, 2009, Inubushi, et al.

\* cited by examiner

*Primary Examiner*—Peter D Mulcahy
(74) *Attorney, Agent, or Firm*—Oblon, Spivak, McClelland, Maier & Neustadt, L.L.P.

(57) ABSTRACT

An oxygen absorption resin composition is provided that comprises a thermoplastic resin (A) having carbon-carbon double bonds substantially in its main chain and a transition metal salt (B). If necessary, the composition further comprises a gas barrier resin (C), a compatibilizer (D) and the like. The composition has excellent oxygen absorption properties, and when the composition is employed, generation of odorous substances derived from the decomposition of resins as a result of oxygen absorption can be suppressed.

17 Claims, 3 Drawing Sheets

OXYGEN ABSORPTION RESIN COMPOSITION

BACKGROUND OF THE INVENTION

1. Field of the Invention

The present invention relates to an oxygen absorption resin composition that has excellent oxygen absorbency and does not emit unpleasant odor as a result of oxygen absorption.

2. Description of the Related Art

Gas barrier resins such as ethylene-vinyl alcohol copolymer (hereinafter also abbreviated as EVOH) are materials having excellent oxygen gas barrier properties and carbon dioxide gas barrier properties. Such a resin can be melt-molded and therefore is used preferably for a multilayered plastic packaging material comprising a layer of the resin laminated with a layer made of a thermoplastic resin (e.g., polyolefin, polyester, etc.) having excellent moisture-resistance, mechanical properties, and the like. However, the gas transmission of these gas barrier resins is not completely zero, and they transmit an amount of gas that cannot be ignored. It is known to use an oxygen absorbent in order to reduce transmission of such a gas, in particular, oxygen, which affects the quality of the content significantly, or in order to remove oxygen that already is present inside a packaging member at the time of packaging its content.

For example, as an improved oxygen absorbent, a composition comprising a transition metal catalyst and an ethylenically unsaturated compound (see Japanese Laid-Open Patent Publication No. 5-115776) and an oxygen scavenger that is a cross-linked polymer (see Japanese Laid-Open Patent Publication No. 11-70331) have been proposed. Furthermore, a resin composition containing EVOH as described above and an oxygen absorbent has been proposed (Japanese Laid-Open Patent Publication Nos. 2001-106866, 2001-106920 and 2002-146217). In particular, similarly to EVOH, the resin composition containing EVOH can be melt-molded and therefore can be used preferably for various packaging materials.

However, when the oxygen absorbent or the oxygen absorption resin composition as described above is used as a packaging material, the oxygen absorbent is decomposed as the oxygen absorption proceeds, and a unpleasant odor may be emitted. Furthermore, the mold-processability of the cross-linked polymers is poor, and therefore, when the polymers are kneaded with a thermoplastic resin, gels are produced, resulting in poor molding, and thus they cannot be put to practical use. In this way, there has been a demand for further improvement in applications in which fragrance is important.

SUMMARY OF THE INVENTION

An oxygen absorption resin composition of the present invention comprises a thermoplastic resin (A) having carbon-carbon double bonds substantially in its main chain and a transition metal salt (B).

In a preferred embodiment, the following inequality (1) is satisfied in the thermoplastic resin (A):

$$100 \times b/(a+b) \leq 7 \quad (1)$$

wherein a (mol/g) is an amount of the carbon-carbon double bonds in its main chain, and b (mol/g) is an amount of the carbon-carbon double bonds in its side chain.

In a preferred embodiment, the thermoplastic resin (A) comprises at least one of the units represented by formula (I) and formula (II):

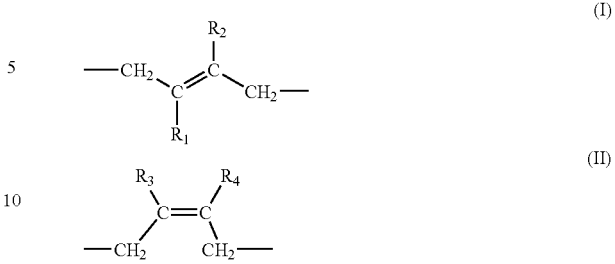

wherein $R_1$, $R_2$, $R_3$ and $R_4$ are the same or different, a hydrogen atom, an alkyl group that may be substituted, an aryl group that may be substituted, an alkylaryl group that may be substituted, $-COOR_5$, $-OCOR_6$, a cyano group or a halogen atom, and $R_3$ and $R_4$ may together form a ring via a methylene group or an oxymethylene group, where $R_5$ and $R_6$ are an alkyl group that may be substituted, an aryl group that may be substituted or an alkylaryl group that may be substituted.

In a preferred embodiment, $R_1$, $R_2$, $R_3$ and $R_4$ are hydrogen atoms in the formula (I) and formula (II).

In a preferred embodiment, the thermoplastic resin (A) is at least one resin selected from the group consisting of polybutadiene, polyisoprene, polychloroprene, and polyoctenylene.

In a preferred embodiment, the thermoplastic resin (A) is at least one resin selected from the group consisting of polybutadiene and polyoctenylene.

In a preferred embodiment, the transition metal salt (B) is at least one metal salt selected from the group consisting of an iron salt, a nickel salt, a copper salt, a manganese salt and a cobalt salt.

In a preferred embodiment, the oxygen absorption rate of the resin composition is at least 0.01 ml/(g·day).

In a preferred embodiment, the resin composition further comprises a gas barrier resin (C) having an oxygen transmission rate of 500 ml·20 μm/(m²·day·atm) or less in 65% RH at 20° C.

In a preferred embodiment, the gas barrier resin (C) is at least one resin selected from the group consisting of a polyvinyl alcohol resin, a polyamide resin, a polyvinyl chloride resin and a polyacrylonitrile resin.

In a preferred embodiment, the gas barrier resin (C) is an ethylene-vinyl alcohol copolymer having an ethylene content of 5 to 60 mol % and a saponification degree of 90% or more.

In a preferred embodiment, the gas barrier resin (C) is contained in an amount of 70 to 99 wt % and the thermoplastic resin (A) is contained in an amount of 30 to 1 wt %, when the total weight of the thermoplastic resin (A) and the gas barrier resin (C) is determined to be 100 wt %.

In a preferred embodiment, the resin composition further comprises a compatibilizer (D).

In a preferred embodiment, the gas barrier resin (C) is contained in an amount of 70 to 98.9 wt %, the thermoplastic resin (A) is contained in an amount of 29.9 to 1 wt %, and the compatibilizer (D) is contained in an amount of 29 to 0.1 wt %, when the total weight of the thermoplastic resin (A), the gas barrier resin (C) and the compatibilizer (D) is determined to be 100 wt %.

In a preferred embodiment, particles of the thermoplastic resin (A) are dispersed in a matrix of the gas barrier resin (C) in the composition.

The present invention further includes a molded product that comprises the oxygen absorption resin composition; a multilayered structure and a multilayered container, both of which comprises a layer made of the resin composition; a multilayered container made of a multilayered film having a total layer thickness of 300 μm or less, wherein the multilayered film comprises a layer made of the resin composition; a multilayered container comprising a layer made of the resin composition and a thermoplastic polyester layer; and a cap having a cap body that is provided with a gasket made of the resin composition.

Thus, the invention described herein makes possible the advantages of: providing an oxygen absorption resin composition that has excellent oxygen absorbency and does not generate unpleasant odor by oxygen absorption; providing a molded product comprising a resin composition having the above-described excellent properties, for example, a multilayered film or a multilayered container including layers made of the resin composition; providing a container comprising the resin composition having the above-described excellent properties that is suitable to store articles such as foods, cosmetics or the like that are susceptible to deterioration caused by oxygen and for which fragrance is important; and providing a resin composition having high oxygen scavenging function, and thus useful as an oxygen scavenger that can be handled easily.

DESCRIPTION OF THE PREFERRED EMBODIMENT

Figure 1:
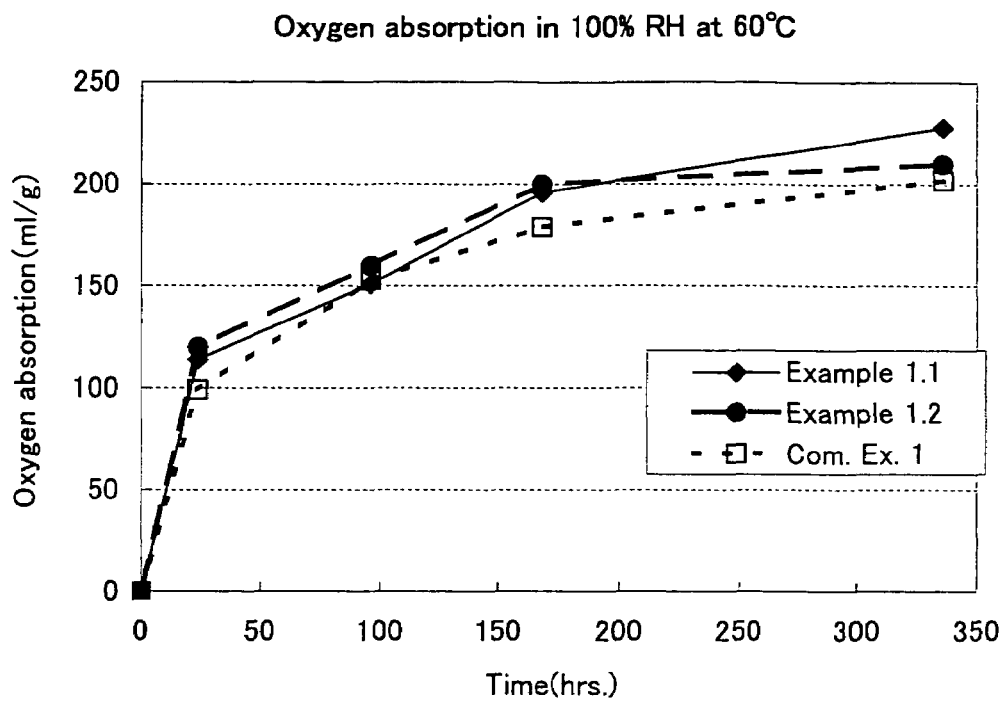
FIG. 1 is a graph in which the oxygen absorption amount of each of the sheets obtained in Examples 1.1 and 1.2 and Comparative Example 1 is plotted against time.

In this specification, "scavenging oxygen" means absorbing and consuming oxygen or reducing the amount of oxygen from a given environment.

An oxygen absorption resin composition of the present invention comprises a thermoplastic resin (A) having carbon-carbon double bonds substantially in its main chain and a transition metal salt (B), and, if necessary, a gas barrier resin (C), a compatibilizer (D) and another thermoplastic resin (E), and various additives. These components will be described in this order below.

(1) Thermoplastic Resin (A) Having Carbon-Carbon Double Bonds Substantially in its Main Chain The resin composition of the present invention comprises a thermoplastic resin (A) having carbon-carbon double bonds substantially in its main chain (in this specification, this resin is also referred to as "thermoplastic resin (A)" or "resin (A)"). Herein, "the thermoplastic resin (A) has carbon-carbon double bonds substantially in its main chain" means that the carbon-carbon double bonds present in the main chain of the resin (A) account for 90% or more, and the carbon-carbon double bonds present in the side chains of the resin (A) account for 10% or less of all the carbon-carbon double bonds in the molecule of the resin (A). The carbon-carbon double bonds present in the side chains preferably account for 7% or less, and more preferably 5% or less. More specifically, in the resin (A), the following inequality (1) is satisfied:

$$100 \times b/(a+b) \leq X \tag{1}$$

wherein a (mol/g) is an amount of the carbon-carbon double bonds in the main chain, and b (mol/g) is an amount of the carbon-carbon double bonds in the side chains, and wherein X is 10, preferably 7, and more preferably 5.

Since the thermoplastic resin (A) has carbon-carbon double bonds within its molecule, the thermoplastic resin (A) can react with oxygen efficiently, and therefore the oxygen scavenging function (i.e., oxygen absorption function) can be obtained. The carbon-carbon double bonds as used herein include conjugated double bonds, but do not include multiple bonds contained in an aromatic ring. The amount of the carbon-carbon double bonds contained in the thermoplastic resin (A) is preferably 0.001 eq/g (equivalents/g) or more, more preferably 0.005 eq/g or more, and even more preferably 0.01 eq/g or more. When the content of the carbon-carbon double bonds is less than 0.001 eq/g, the oxygen scavenging function of the resultant resin composition may be insufficient.

As described above, since the thermoplastic resin (A) has carbon-carbon double bonds substantially in its main chain, low molecular weight degradation products formed by the cleavage of the double bonds in its side chains due to a reaction with oxygen are substantially not formed. Some of the low molecular weight degradation product may emit unpleasant odor, and since such degradation products are not formed, there is no unpleasant odor. On the other hand, when a thermoplastic resin having carbon-carbon double bonds in its side chains is employed, degradation products are produced by the cleavage of the double bonds in the side chains, as described above, although there is no problem in terms of oxygen absorption. Therefore, unpleasant odor is emitted, and may impair the ambient atmosphere significantly.

In the thermoplastic resin (A), when a carbon-carbon double bond in the main chain is reacted with oxygen, oxidation is effected at an allyl carbon (i.e., carbon adjacent to the double bond) site, so that it is preferable that the allyl carbon is not a quaternary carbon. Furthermore, it is still possible that a low molecular weight degradation product may be formed by the cleavage of the main chain, so that in order to suppress this, it is preferable that the allyl carbon is a non-substituted carbon, that is, a methylene carbon. Accordingly, it is preferable that the thermoplastic resin (A) has at least one of the units represented by formula (I) and formula (II):

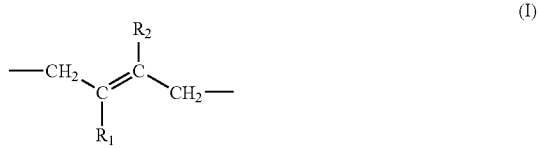

-continued

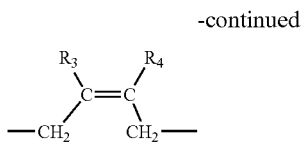

(II)

wherein $R_1$, $R_2$, $R_3$ and $R_4$ are the same or different, a hydrogen atom, an alkyl group that may be substituted, an aryl group that may be substituted, an alkylaryl group that may be substituted, —$COOR_5$, —$OCOR_6$, a cyano group or a halogen atom, and $R_3$ and $R_4$ may together form a ring via a methylene group or an oxymethylene group, where $R_5$ and $R_6$ are an alkyl group that may be substituted, an aryl group that may be substituted or an alkylaryl group that may be substituted.

The number of carbon atoms of the alkyl group is preferably 1 to 5. The number of carbon atoms of the aryl group is preferably 6 to 10. The number of carbon atoms of the alkylaryl group is preferably 7 to 11. Examples of the alkyl group include a methyl group, an ethyl group, a propyl group, and a butyl group. An example of the aryl group includes a phenyl group. An example of the alkylaryl group includes a tolyl group. An example of the halogen atom includes a chlorine atom. Furthermore, examples of the substituent that can be present in the thermoplastic resin (A) include various hydrophilic groups. "Hydrophilic group" herein refers to a hydroxyl group, an alkoxy group having 1 to 10 carbon atoms, an amino group, an aldehyde group, a carboxyl group, an epoxy group, an ester group, a carboxylic acid anhydride group, and a polar group containing boron (e.g., a boronic acid group, a boronic ester group, a boronic acid anhydride group and a boronate group).

Among the above thermoplastic resins (A), compounds in which all $R_1$, $R_2$, $R_3$ and $R_4$ are hydrogen atoms in each unit of the formulae (I) and (II) constituting the resin are particularly preferable in terms of preventing odor. The reason for this is not fully clear, but it is theorized that when $R_1$, $R_2$, $R_3$ and $R_4$ are groups other than hydrogen, these groups may be oxidized and cleaved, and thus changed into an odorous substance when the thermoplastic resin (A) is reacted with oxygen.

Among the units represented by formulae (I) and (II), a unit derived from a diene compound is preferable. This is because the thermoplastic resin having that structure can be easily produced. Examples of such a diene compound include isoprene, butadiene, 2-ethylbutadiene, and 2-butylbutadiene, and chloroprene. One of these can be used, or two or more can be used in combination. Examples of the thermoplastic resin (A) containing these units include polybutadiene, polyisoprene, polychloroprene and polyoctenylene. Among these, polybutadiene or polyoctenylene is particularly preferable. As the thermoplastic resin (A), a copolymer containing the above-described unit and another unit than that can be used. As a copolymerized component, styrene, acrylonitrile, or propylene can be employed. When the thermoplastic resin (A) is such a copolymer, the total content of the unit shown by the formula (I) and the unit shown by the formula (II) is preferably 50 mol % or more, and more preferably 70 mol % or more with respect to all the units constituting the copolymer.

The number average molecular weight of the thermoplastic resin (A) is preferably 1000 to 500000, more preferably 5000 to 300000, even more preferably 10000 to 250000, and particularly preferably 40000 to 200000. When the molecular weight of the thermoplastic resin (A) is less than 1000 or more than 500000, the mold-processability and the handling properties of the resultant resin composition may be poor, or the mechanical properties such as strength or elongation may be decreased when the resin is formed into a molded product. Furthermore, when the thermoplastic resin (A) is mixed with a gas barrier resin (C), which will be described later, then the dispersion may be lowered, and consequently the gas barrier properties and the oxygen scavenging performance may be degraded.

The thermoplastic resin (A) can be a single resin or a mixture of a plurality of resins.

A method for producing the thermoplastic resin (A) having carbon-carbon double bonds substantially in its main chain is not limited and may depend on the kind of the thermoplastic resin (A). For example, in the case of polybutadiene (e.g., cis-1,4-polybutadiene), the thermoplastic resin (A) can be synthesized using a cobalt-based or nickel-based catalyst as the catalyst. More specifically, for example, a combination of a $CoCl_2.2C_5H_5N$ complex and diethyl aluminum chloride can be used as such a catalyst. An example of a solvent that can be used is an inactive organic solvent. Above all, hydrocarbons having 6 to 12 carbon atoms, for example, alicyclic hydrocarbons such as hexane, heptane, octane, and decane, or aromatic hydrocarbons such as toluene, benzene, and xylene are preferable. The polymerization is generally carried out at a temperature of −78 to 70° C. for 1 to 50 hours.

The carbon-carbon double bonds present after polymerization can be partly reduced with hydrogen within the range not interfering with the effects of the resin composition of the present invention. In this case, it is preferable that the carbon-carbon double bonds that remain in the side chains are selectively reduced with hydrogen.

The thermoplastic resin (A) can contain an antioxidant. As the antioxidant, for example, the following compounds can be used: 2,5-di-tert-butylhydroquinone, 2,6-di-tert-butyl-p-cresol, 4,4,'-thiobis(6-tert-butylphenol), 2,2'-methylene-bis(4-methyl-6-tert-butylphenol), octadecyl-3-(3',5'-di-tert-butyl-4'-hydroxyphenyl)propionate, 4,4'-thiobis(6-tert-butylphenol), 2-tert-butyl-6-(3-tert-butyl-2-hydroxy-5-methylbenzyl)-4-methylphenylacrylate, pentaerythritoltetrakis(3-laurylthiopropionate), 2,6-di-(tert-butyl)-4-methylphenol (BHT), 2,2-methylenebis(6-tert-butyl-p-cresol), triphenyl phosphite, tris(nonylphenyl) phosphite, dilauryl thiodipropionate or the like.

The amount of the antioxidant to be contained in the thermoplastic resin (A) is determined as appropriate, in view of the kinds and the contents of components of the resin composition, and the use and the storage conditions of the resin composition, and the like. In general, the amount of the antioxidant is preferably 0.01 to 1% by weight, more preferably 0.02 to 0.5% by weight, based on the total weight of the thermoplastic resin (A) and the antioxidant. If the amount of the antioxidant is too large, the reaction of the thermoplastic resin (A) and oxygen is inhibited, so that the oxygen scavenging function of the resin composition of the present invention may be insufficient. On the other hand, if the amount of the antioxidant is too small, the reaction with oxygen may proceed during storage or melt-kneading of the thermoplastic resin (A), so that the oxygen scavenging function may be lowered before the resin composition of the present invention is actually put to use.

For example, in the case where the thermoplastic resin (A) is stored at a comparatively low temperature or under an inactive gas atmosphere, or in the case where the resin composition is produced by melt-kneading in sealing with nitrogen, the amount of the antioxidant can be small. In the case where an oxidation catalyst is added in a comparatively large amount to facilitate oxidation, even though the thermoplastic resin (A) contains a certain amount of an antioxidant, a resin composition having good oxygen scavenging function can be obtained.

(2) Transition Metal Salt (B)

The transition metal salt (B) has an effect of improving the oxygen scavenging function of the resin composition by facilitating the oxidation reaction of the thermoplastic resin (A). For example, the transition metal salt (B) facilitates a reaction of the thermoplastic resin (A) and oxygen present inside a packaging material obtained from the resin composition of the present invention as well as a reaction of the thermoplastic resin (A) and oxygen that is passing through the packaging material, so that the oxygen scavenging function of the packaging material can be improved.

Examples of the transition metal contained in the transition metal salt (B) include, but are not limited to, iron, nickel, copper, manganese, cobalt, rhodium, titanium, chromium, vanadium, and ruthenium. Among these metals, iron, nickel, copper, manganese, and cobalt are preferable, manganese and cobalt are more preferable, and cobalt is even more preferable.

Examples of counter ions for the metal contained in the transition metal salt (B) include an anion derived from an organic acid or a chloride. Examples of the organic acid include, but are not limited to, acetic acid, stearic acid, acetylacetone, dimethyldithiocarbamic acid, palmitic acid, 2-ethylhexanoic acid, neodecanoic acid, linoleic acid, tallic acid, oleic acid, resin acid, capric acid, and naphthenic acid. Especially preferred salts are cobalt 2-ethylhexanoate, cobalt neodecanoate, and cobalt stearate. The metal salt may be a so-called ionomer having a polymeric counter ion.

The transition metal salt (B) is contained in the composition preferably in a ratio of 1 to 50000 ppm in terms of the metal element with respect to the weight of the thermoplastic resin (A). The transition metal salt (B) is contained more preferably in a ratio of 5 to 10000 ppm, and even more preferably in a ratio of 10 to 5000 ppm. When the resin composition of the present invention contains a gas barrier resin (C), in addition to the thermoplastic resin (A), as described later, the transition metal salt (B) is contained preferably in a ratio of 1 to 50000 ppm in terms of the metal element with respect to the total amount of the thermoplastic resin (A) and the gas barrier resin (C). When the resin composition contains a gas barrier resin (C) and a compatibilizer (D), in addition to the thermoplastic resin (A), as described later, the transition metal salt (B) is contained preferably in a ratio of 1 to 50000 ppm in terms of the metal element with respect to the total amount of the thermoplastic resin (A), the gas barrier resin (C) and the compatibilizer (D). In each of the cases, more preferably, the transition metal salt (B) is contained preferably in a ratio of 5 to 10000 ppm, and even more preferably in a ratio of 10 to 5000 ppm. If the content of the transition metal salt (B) is less than 1 ppm, the oxygen absorption effect of the resin composition may be insufficient. On the other hand, if the content of the transition metal salt (B) is more than 50000 ppm, the thermal stability of the resin composition may be degraded, and a significant amount of decomposed gas, gels or aggregates may be generated.

(3) Gas Barrier Resin (C)

As the gas barrier resin (C) that can be contained in the oxygen absorption resin composition of the present invention, a gas barrier resin (C) having an oxygen transmission rate of 500 ml·20l m/(m$^2$·day·atm) or less in 65% RH at 20° C. is preferable. This means that the volume of oxygen that is to be transmitted through a film having an area of 1 m$^2$ and a thickness of 20 μm per day under a differential pressure of oxygen of 1 atm is 500 ml or less when measurement is performed in a relative humidity of 65% at a temperature of 20° C. If a resin having an oxygen transmission rate of more than 500 ml·20 μm/(m$^2$·day·atm) is employed, the gas barrier properties of the resultant resin composition may be insufficient. The oxygen transmission rate of the gas barrier resin (C) is preferably 100 ml·20 μm/(m$^2$·day·atm) or less, more preferably 20 ml·20 μm/(m$^2$·day·atm) or less, and most preferably 5 ml·20 μm/(m$^2$·day·atm) or less. Such a gas barrier resin (C) and the thermoplastic resin (A) having carbon-carbon double bonds are contained, so that the oxygen absorption effect as well as the gas barrier properties are exhibited, and consequently a resin composition having exceptionally high gas barrier properties can be obtained.

Typical examples of the above-described gas barrier resin (C) include a polyvinyl alcohol resin (C1), a polyamide resin (C2), a polyvinyl chloride resin (C3) and a polyacrylonitrile resin (C4), but are not limited thereto.

Of the gas barrier resin (C), the polyvinyl alcohol resin (C1) is obtained by saponifying a vinyl ester homopolymer or a copolymer of vinyl ester and another monomer (especially, a copolymer of vinyl ester and ethylene) using an alkaline catalyst or the like. A typical compound as the vinylester can be vinyl acetate, but other fatty acid vinylesters (e.g., vinyl propionate, vinyl pivalate, etc.) also can be used.

The degree of saponification of the vinyl ester component of the polyvinyl alcohol resin is preferably 90% or more, more preferably 95% or more, even more preferably 96% or more. If the degree of saponification is less than 90%, the gas barrier properties under high humidity may be lowered. Further, when the polyvinyl alcohol resin is an ethylene-vinyl alcohol copolymer (EVOH), the thermal stability is insufficient, and the resultant molded product tends to contain gels or aggregates.

When the polyvinyl alcohol resin is a blend of at least two kinds of polyvinyl alcohol resins having different degrees of saponification, the average calculated based on the blend weight ratio is determined as the degree of saponification of the blend.

Among the polyvinyl alcohol resins as described above, EVOH is preferable because melt-molding is possible and its gas barrier properties under high humidity are good.

The ethylene content of EVOH is preferably in the range of 5 to 60 mol %. If the ethylene content is less than 5 mol %, the gas barrier properties under high humidity may be low and the melt moldability may be poor. The ethylene content of EVOH is preferably 10 mol % or more, more preferably 15 mol % or more, most preferably 20 mol % or more. If the ethylene content exceeds 60 mol %, sufficiently good gas barrier properties may not be obtained. The ethylene content is preferably 55 mol % or less, more preferably 50 mol % or less.

The EVOH to be used preferably has an ethylene content of 5 to 60 mol % and a degree of saponification of 90% or more, as described above. When the multilayered container comprising the resin composition of the present invention is desired to have an excellent impact delamination resistance, it is preferable to employ an EVOH having an ethylene content of 25 mol % or more and 55 mol % or less and a degree of saponification of 90% or more and less than 99%.

When the EVOH is a blend of at least two kinds of EVOH having different ethylene contents, the average calculated based on the blend weight ratio is determined as the ethylene content of the blend. In this case, it is preferable that the difference in the ethylene contents between the two kinds of EVOH having the largest difference from each other is 30 mol % or less and that the difference in the degree of saponification is 10% or less. If these conditions are not satisfied, the transparency of the resin composition may be inadequate. The difference in the ethylene content is preferably 20 mol % or less, and more preferably 15 mol % or less. The difference in the degree of saponification is preferably 7% or less, and more preferably 5% or less. When the multilayered container comprising the resin composition of the present invention is desired to have higher and balanced impact delamination resistance and gas barrier properties, it is preferable to blend an EVOH (c'1) having an ethylene content of 25 mol % or more and 55 mol % or less and a degree of saponification of 90% or more and less than 99% and an EVOH (c'2) having the ethylene content of 25 mol % or more and 55 mol % or less and a degree of saponification of 99% or more at a blend weight ratio c'1/c'2 of 5/95 to 95/5 for use.

The ethylene content and the degree of saponification of EVOH can be obtained by nuclear magnetic resonance (NMR).

The EVOH can contain a small amount of a monomer unit other than the ethylene unit and the vinyl alcohol unit as a copolymer unit within a range not interfering with the objects of the present invention. Examples of a monomer constituting such a monomer unit include the following compounds: α-olefins such as propylene, 1-butene, isobutene, 4-methyl-1-pentene, 1-hexene, and 1-octene; unsaturated carboxylic acids such as itaconic acid, methacrylic acid, acrylic acid, and maleic anhydride, and their salts, their partial or complete esters, their nitrites, their amides, and their anhydrides; vinylsilane compounds such as vinyltrimethoxysilane, vinyltriethoxysilane, vinyltri(β-methoxyethoxy)silane, γ-methacryloxypropyltrimethoxysilane; unsaturated sulfonic acids and their salts; alkylthiols; and vinylpyrrolidones.

When a vinylsilane compound is contained in EVOH as a copolymerized component in an amount of 0.0002 to 0.2 mol % and the composition of the present invention containing the EVOH is formed into a multilayered structure together with a resin (e.g., polyester; hereinafter may be referred to as "PES") as a base resin by coextrusion molding or coinjection molding, the consistency in the melt viscosity of the EVOH with the base resin is improved, so that a uniformly molded product can be produced. As the vinylsilane compound, vinyltrimethoxysilane and vinyltriethoxysilane can be used preferably.

Furthermore, EVOH containing a boron compound is also effective in improving the melt viscosity of the EVOH, so that articles can be uniformly molded by coextrusion or coinjection molding. Examples of the boron compound include boric acids, boric acid esters, borates, and boron hydrides. Specifically, examples of the boric acids include orthoboric acid (hereinafter may be referred to as "boric acid"), metaboric acid, and tetraboric acid. Examples of the boric acid esters include triethyl borate and trimethyl borate. Examples of the borates include alkali metal salts and alkaline-earth metal salts of the above-mentioned boric acids, borax, and the like. Among these compounds, orthoboric acid is preferable.

The content of the boron compound, if contained, is preferably in the range of 20 to 2000 ppm, and more preferably 50 to 1000 ppm, in terms of the boron element. With the addition of boron within this range, torque variation in EVOH during melting by heating is suppressed. If the boron content is less than 20 ppm, this effect is minimal. If it exceeds 2000 ppm, gelation tends to occur resulting in poor moldability.

It is also effective to add an alkali metal salt to the EVOH in an amount of 5 to 5000 ppm in terms of the alkali metal element in order to improve interlayer adhesions and compatibility. The added amount of the alkali metal salt is preferably in the range of 20 to 1000 ppm, and more preferably 30 to 500 ppm, in terms of the alkali metal element. Examples of the alkali metal include lithium, sodium, potassium, and the like. Examples of the alkali metal salt include aliphatic carboxylates, aromatic carboxylates, phosphates, and metal complexes of alkali metals. Specifically, they include sodium acetate, potassium acetate, sodium phosphate, lithium phosphate, sodium stearate, potassium stearate, a sodium salt of ethylenediaminetetraacetic acid, and the like. Among these, sodium acetate, potassium acetate, and sodium phosphate are preferable.

It is also preferable to add a phosphorus compound to the EVOH in an amount of 20 to 500 ppm, more preferably 30 to 300 ppm, and most preferably 50 to 200 ppm, in terms of the phosphoric acid radicals. When a phosphorus compound is blended with the EVOH in the above range, the thermal stability of the EVOH can be improved. In particular, generation of gelled aggregates and coloring during long-duration melt molding can be suppressed.

There is no particular limitation regarding the kind of phosphorus compound added to the EVOH, and various kinds of acids such as phosphoric acid and phosphorous acid and salts thereof may be used. Phosphates may be in the form of primary phosphates, secondary phosphates, or tertiary phosphates. There is no particular limitation regarding the cationic species of the phosphates, but the cationic species are preferably alkali metal and alkaline-earth metal. Among these, it is preferable to add the phosphorus compound in the form of sodium dihydrogenphosphate, potassium dihydrogenphosphate, disodium hydrogenphosphate, or dipotassium hydrogenphosphate.

A preferable melt flow rate (MFR) of the EVOH (210° C., 2160 g load; according to JIS K7210) is in the range of 0.1 to 100 g/10 min, more preferably 0.5 to 50 g/10 min, and even more preferably 1 to 30 g/10 min.

The kind of the polyamide resin (C2) as the gas barrier resin (C) is not specifically limited. Examples thereof include: aliphatic polyamides which are homopolymers such as polycaproamide (Nylon-6), polyundecanamide (Nylon-11), polylaurolactam (Nylon-12), polyhexamethyleneadipamide (Nylon-6,6), and polyhexamethylenesebacamide (Nylon-6,10); aliphatic polyamides which are copolymers such as a caprolactam/laurolactam copolymer (Nylon-6/12), a caprolactam/aminoundecanoic acid copolymer (Nylon-6/11), a caprolactam/co-aminononanoic acid copolymer (Nylon-6/9), a caprolactam/hexamethylene adipamide copolymer (Nylon-6/6,6), and a caprolactam/hexamethylene adipamide/hexamethylene sebacamide copolymer (Nylon-6/6,6/6,10); and aromatic polyamides such as polymetaxylylene adipamide (MX-Nylon) and a hexamethylene terephthalamide/hexamethylene isophthalamide copolymer (Nylon-6T/6I). These polyamide resins (C2) can be employed alone or in combinations of two or more. Among these, polycaproamide (Nylon-6) and polyhexamethylene adipamide (Nylon-6,6) are preferable in view of gas barrier properties.

Examples of the polyvinyl chloride resin (C3) include a homopolymer such as a vinyl chloride homopolymer and a vinylidene chloride homopolymer and a copolymer containing vinyl chloride or vinylidene chloride and further containing vinyl acetate, a maleic acid derivative, a higher alkyl vinyl ether or the like.

Examples of the polyacrylonitrile resin (C4) include a homopolymer of acrylonitrile and copolymers of acrylonitrile and an acrylic ester or the like.

As the gas barrier resin (C), one of the above-described resins can be used, or two or more can be used in combination. Among those, the polyvinyl alcohol resin (C1) is preferable and the EVOH having an ethylene content of 5 to 60 mol % and a degree of saponification of 90% or more is more preferable.

It is also possible to blend to the gas barrier resin (C) a thermal stabilizer, an ultraviolet absorber, an antioxidant, a coloring agent, a filler, and other resins (e.g., polyamides and polyolefins) in advance, within a range not interfering with the objects of the present invention.

When the oxygen absorption resin composition of the present invention contains the gas barrier resin (C) as a resin component, in addition to the thermoplastic resin (A), it is preferable to contain the thermoplastic resin (A) in a ratio of 30 to 1 wt % and to contain the gas barrier resin (C) in a ratio of 70 to 99 wt %, when the total weight of the thermoplastic resin (A) and the gas barrier resin (C) is 100 wt %. If the content of the gas barrier resin (C) is less than 70 wt %, the gas barrier properties of the resin composition with respect to oxygen gas or carbon dioxide gas may deteriorate. On the other hand, if the content of the gas barrier resin (C) is more than 99 wt %, the oxygen scavenging function may deteriorate, because the content of the thermoplastic resin (A) is small. The content of the thermoplastic resin (A) is more preferably 20 to 2 wt %, even more preferably 15 to 3 wt %, and the content of the gas barrier resin (C) is more preferably 80 to 98 wt %, and even more preferably 85 to 97 wt %.

(4) Compatibilizer (D)

The compatibilizer (D) is contained, if necessary, for the purpose of improving the compatibility of resins and allowing the resultant resin composition to provide stable morphology, when the thermoplastic resin (A) and the gas barrier resin (C) are contained, or when another resin (E), which will be described later, is further contained in the resin composition of the present invention. There is no limitation regarding the kind of the compatibilizer (D), and the compatibilizer (D) can be selected as appropriate, depending on the combination of the thermoplastic resin (A), the gas barrier resin (C), and the like that are to be employed.

For example, when the gas barrier resin (C) has a high polarity, such as polyvinyl alcohol resin, a hydrocarbon polymer containing a polar group or an ethylene-vinyl alcohol copolymer is preferable as the compatibilizer (D). For example, when a hydrocarbon polymer containing a polar group is employed as the compatibilizer (D), a polyhydrocarbon moiety in the polymer, the moiety accounting for the main portion, enhances the affinity between the compatibilizer (D) and the thermoplastic resin (A). The polar group in the compatibilizer (D) enhances the affinity between the compatibilizer (D) and the gas barrier resin (C). As a result, the resultant resin composition can be provided with stable morphology.

Examples of a monomer that can form the polyhydrocarbon moiety that accounts for the main portion of the hydrocarbon polymer containing a polar group include $\alpha$-olefins such as ethylene, propylene, 1-butene, isobutene, 3-methyl pentene, 1-hexene, and 1-octene; styrenes such as styrene, $\alpha$-methylstyrene, 2-methylstyrene, 4-methylstyrene, 4-propylstyrene, 4-tert-butylstyrene, 4-cyclohexylstyrene, 4-dodecylstyrene, 2-ethyl-4-benzylstyrene, 4-(phenylbutyl)styrene, 2,4,6-trimethylstyrene, monofluorostyrene, difluorostyrene, monochlorostyrene, dichlorostyrene, methoxystyrene, and tert-butoxystyrene; vinylnaphthalenes such as 1-vinylnaphthalene, 2-vinylnaphthalene; aromatic compounds containing a vinylene group such as indene and acenaphthylene; and conjugated diene compounds such as butadiene, isoprene, 2,3-dimethyl butadiene, pentadiene, and hexadiene. The hydrocarbon polymer may be derived from primarily one of these monomers, or may be derived from primarily two or more of these monomers.

The hydrocarbon polymer containing a polar group is prepared using one or more of the above-listed monomers, as described later, and the monomer forms a polyhydrocarbon moiety corresponding to one of the following polymers: an olefin copolymer such as polyethylene (very low density, low density, linear low density, medium density, or high density polyethylene), ethylene-(meth)acrylic ester (methyl ester, ethyl ester, etc.) copolymer, ethylene-vinyl acetate copolymer, ethylene-vinyl alcohol copolymer, polypropylene, ethylene-propylene copolymer; a styrene polymer such as polystyrene, styrene-acrylonitrile copolymer, styrene-acrylonitrile-butadiene copolymer, a styrene-diene block copolymer (e.g., styrene-isoprene block copolymer, styrene-butadiene copolymer, styrene-isoprene-styrene block copolymer, etc.), and a hydrogenated product thereof, a (meth)acrylate polymer such as polymethyl acrylate, polyethyl acrylate, and polymethyl methacrylate; a halogenated vinyl polymer such as polyvinyl chloride and vinylidene fluoride; a semi-aromatic polyester such as polyethylene terephthalate and polybutylene terephthalate; and an aliphatic polyester such as polyvalerolactone, polycaprolactone, polyethylene succinate, and polybutylene succinate. Among these, styrene polymers such as styrene-diene block copolymers (e.g., styrene-isoprene block copolymer, styrene-butadiene copolymer, styrene-isoprene-styrene block copolymer, etc.), and a hydrogenated product thereof are preferable.

There is no particular limitation regarding the polar group contained in the compatibilizer (D), but a functional group containing an oxygen atom is preferable. More specifically, the following groups are preferred: active hydrogen-containing polar groups (e.g., $-SO_3H$, $-SO_2H$, $-SOH$, $-CONH_2$, $-CONHR$, $-CONH-$, $-OH$, etc.), nitrogen-containing polar groups that are free from active hydrogen (e.g., $-NCO$, $-OCN$, $-NO$, $-NO_2$, $-CONR_2$, $-CONR-$, etc.), an epoxy group, carbonyl group-containing polar groups (e.g., $-CHO$, $-COOH$, $-COOR$, $-COR$, $>C=O$, $-CSOR$, $-CSOH$, etc.), phosphorus-containing polar groups (e.g., $-P(OR)_2$, $-PO(OR)_2$, $-PO(SR)_2$, $-PS(OR)_2$, $-PO(SR)(OR)$, $-PS(SR)(OR)$, etc.), boron-containing polar groups and the like. In the above general formulae, R represents an alkyl group, a phenyl group or an alkoxy group.

There is no particular limitation regarding the method for producing the hydrocarbon polymer containing the polar group. For example, the following methods can be employed: 1) a method of copolymerizing a monomer that can form the polyhydrocarbon moiety and a monomer containing the polar group (or a group that can form the polar group); 2) a method of utilizing an initiator or a chain transfer agent having the polar group (or a group that can form the polar group) when polymerizing monomers that can form the polyhydrocarbon moiety; 3) a method of subjecting a monomer that can form the polyhydrocarbon moiety to living polymerization and utilizing a monomer having the polar group (or a group that can form the polar group) as a terminator (i.e., an end treatment agent); and 4) a method of polymerizing monomers that can form the polyhydrocarbon moiety, followed by an introduction of a monomer having the polar group (or a group that can form the polar group) to a reactive moiety of the resultant polymer, for example, a carbon-carbon double bond moiety by a reaction. In the method 1, for copolymerization, any one of polymerization methods of random copolymerization, block copolymerization and graft copolymerization can be employed.

When the compatibilizer (D) is a hydrocarbon polymer, the following polar groups are particularly preferable: carboxyl groups such as a carboxyl group, a carboxylic acid anhydride group, and a carboxylate group, and boron-containing polar groups such as a boronic acid group, a boronic ester group, boronic acid anhydride group and boronate groups.

When the polar group is a carboxyl group, the resultant resin composition has a high thermal stability. As described above, when the resin composition contains an excessive amount of a transition metal salt (B), the thermal stability of the resin composition may be deteriorated, but when compatibilizer (D) having a carboxyl group is contained together with the transition metal salt (B), the thermal stability of the resin composition can be maintained. The reason of this significant effect is not clear, but it seems that this is caused by interaction between the compatibilizer (D) and the transition metal salt (B). When the polar group is a boron-containing polar group, the compatibility of the thermoplastic resin (A) and the gas barrier resin (C) is improved significantly in the resultant resin composition, and stable morphology can be provided.

A compatibilizer (D) having such a polar group is disclosed in detail, for example, in Japanese Laid-Open Patent Publication No. 2002-146217. Among the compatibilizers disclosed in the publication, a styrene-hydrogenated diene block copolymer having a boronic ester group is preferable.

As the compatibilizer (D), as described above, ethylene-vinyl alcohol copolymers can also be used. In particular, when the gas barrier resin (C) is EVOH, its effect as the compatibilizer is exhibited sufficiently. Among these, an ethylene-vinyl alcohol copolymer having an ethylene content of 70 to 99 mol % and a degree of saponification of 40% or more is preferable to improve the compatibility. The ethylene content is more preferably 72 to 96 mol %, even more preferably 72 to 94 mol %. When the ethylene content is less than 70 mol %, the affinity with the thermoplastic resin (A) may be deteriorated. When the ethylene content is more than 99 mol %, the affinity with the EVOH may be deteriorated. Furthermore, the degree of saponification is preferably 45% or more. There is no limitation regarding the upper limit of the degree of saponification, and an ethylene-vinyl alcohol copolymer having a degree of saponification of substantially 100% can be used. When the degree of saponification is less than 40%, the affinity with the EVOH may be deteriorated.

The above-described compatibilizer (D) can be used alone or in combination of two or more.

When the oxygen absorption resin composition of the present invention contains the gas barrier resin (C) and the compatibilizer (D) as resin components, in addition to the thermoplastic resin (A), it is preferable that the thermoplastic resin (A) is contained in a ratio of 29.9 to 1 wt %, the gas barrier resin (C) is contained in a ratio of 70 to 98.9 wt %, and the compatibilizer (D) is contained in a ratio of 29 to 0.1 wt %, when the total weight of the thermoplastic resin (A), the gas barrier resin (C) and the compatibilizer (D) is 100 wt %. If the content of the gas barrier resin (C) is less than 70 wt %, the gas barrier properties of the resin composition with respect to oxygen gas or carbon dioxide gas may deteriorate. On the other hand, if the content of the gas barrier resin (C) is more than 98.9 wt %, the content of the thermoplastic resin (A) and the compatibilizer (D) is small, so that the oxygen scavenging function may deteriorate, and the stability of the morphology of the entire resin composition may be impaired. The content of the thermoplastic resin (A) is more preferably 19.5 to 2 wt %, even more preferably 14 to 3 wt %. The content of the gas barrier resin (C) is more preferably 80 to 97.5 wt %, and even more preferably 85 to 96 wt %. The content of the compatibilizer (D) is more preferably 18 to 0.5 wt %, and even more preferably 12 to 1 wt %.

(5) Another Thermoplastic Resin (E) and Additives

The oxygen absorption resin composition of the present invention may include a thermoplastic resin (E) other than the thermoplastic resin (A), the gas barrier resin (C) and the compatibilizer (D) within the range not interfering with the effects of the present invention. Examples of the thermoplastic resin (E) include, but are not limited to, polyolefins such as polyethylene, polypropylene, ethylene-propylene copolymer, a copolymer including ethylene or propylene (e.g., a copolymer including ethylene or propylene and at least one of the following monomers as a copolymerized unit: $\alpha$-olefins such as 1-butene, isobutene, 4-methyl-1-pentene, 1-hexene, and 1-octene; unsaturated carboxylic acids such as itaconic acid, methacrylic acid, acrylic acid, and maleic anhydride, and their salts, their partial or complete esters, their nitriles, their amides, and their anhydrides; vinyl carboxylates such as vinyl formate, vinyl acetate, vinyl propionate, vinyl butylate, vinyl octanoate, vinyl dodecanoate, vinyl stearate, and vinyl arachidonate; vinylsilane compounds such as vinyltrimethoxysilane; unsaturated sulfonic acids and their salts; alkylthiols; vinyl pyrrolidones and the like), poly-4-methyl-1-pentene, and poly-1-butene; polyesters such as polyethylene terephthalate, polybutylene terephthalate, and polyethylene naphthalate; polystyrene, polycarbonates, and polyacrylates. The thermoplastic resin (E) can be contained in a ratio of at most 10 wt % of the total weight of the resin composition.

In the resin composition of the present invention, various additives can be added within the range not interfering with the function and the effects of the present invention. Examples of such additives include antioxidants, plasticizers, thermal stabilizers (i.e., melt stabilizers), photoinitiators, deodorants, ultraviolet absorbers, antistatic agents, lubricants, colorants, fillers, drying agents, filling agents, pigments, dyes, processing aids, flame retarders, antifogging agents, or other polymer compounds. Such additives are disclosed in detail, for example, in Japanese Laid-Open Patent Publication No. 2002-146217.

(6) Oxygen Absorption Resin Composition and Molded Product Using the Same

The oxygen absorption resin composition of the present invention contains the thermoplastic resin (A) and the transition metal salt (B), and if necessary, the gas barrier resin (C), the compatibilizer (D) and another thermoplastic resin (E), and various additives as mentioned above. The oxygen absorption rate of the resin composition of the present invention is preferably 0.01 ml/(g·day) or more, more preferably 0.05 ml/(g·day) or more. Herein, the oxygen absorption rate is a volume of oxygen that is absorbed by a film made of the resin composition per unit weight in a unit time, when the film is stored in the air with a predetermined volume. A specific method for measuring the oxygen absorption rate will be shown in Examples described later. The composition can be formed into a molded product having a desired shape by mixing the components of the composition and molding, as described later.

When the oxygen absorption resin composition of the present invention is a composition containing the gas barrier resin (C), in addition to the thermoplastic resin (A) and the transition metal salt (B), the function of the gas barrier resin (C) can be provided, and moreover, the oxygen scavenging function tend to be retained for a long period of time and generation and emission of odorous substance tend to be suppressed. In this way, the composition containing the gas barrier resin (C) retains a high oxygen scavenging ability for a longer time, and odor generated due to the absorption of oxygen tends to be reduced compared with a composition including only the thermoplastic resin (A) and the transition metal salt (B). In particular, when the gas barrier resin (C) is a polyvinyl alcohol resin, especially, EVOH, generation of odor is suppressed to a very low level. The mechanism for this is not clear, but it can be theorized that it is more difficult for the gas barrier resin to transmit an odorous substance having a large molecular weight than oxygen, and the polyvinyl alcohol resin is reacted with or absorbs the odorous substance.

In the oxygen absorption resin compositions of the present invention that contain a certain resin other than the thermoplastic resin (A), such as the gas barrier resin (C), it is recommended that particles of the thermoplastic resin (A) are dispersed in a matrix comprising the resin other than the thermoplastic resin (A) (i.e., at least one of the gas barrier resin (C), the compatibilizer (D), and the thermoplastic resin (E)), the transition metal salt (B), and various additives. For example, when the oxygen absorption resin composition of the present invention is essentially composed of the thermoplastic resin (A) and the gas barrier resin (C), it is recommended that particles of the thermoplastic resin (A) are dispersed in a matrix of the gas barrier resin (C). This form is preferable, because resultant molded products made of the composition of this form can easily maintain the oxygen scavenging performance and the gas barrier properties. Furthermore, the function of the resin other than the thermoplastic resin (A), such as the gas barrier resin (C), can be provided. This also exhibits good transparency. In this case, it is preferable that the average particle size of the thermoplastic resin (A) is 10 µm or less. When the average particle size is more than 10 µm, the area of the interface between the thermoplastic resin (A) and the resin other than the thermoplastic resin (A) (e.g., the gas barrier resin (C)) becomes small, so that the oxygen gas barrier properties and the oxygen scavenging function may be degraded. The average size of the particles of the thermoplastic resin (A) is preferably 5 µm or less, and more preferably 2 µm or less.

In order to realize the above-described embodiment and realize excellent gas barrier properties, oxygen scavenging performance and low odor, the number average molecular weight is preferably 1000 to 500000, more preferably 5000 to 300000, and even more preferably 10000 to 250000, and particularly preferably 40000 to 200000. It is also preferable that the thermoplastic resin (A) is substantially not cross-linked.

Furthermore, when the gas barrier resin (C) has a high polarity, such as polyvinyl alcohol resin, it is preferable that the thermoplastic resin has a hydrophilic functional group as described above such as hydroxyl group, an alkoxy group having 1 to 10 carbon atoms, an amino group, an aldehyde group, a carboxyl group, an epoxy group, an ester group, a carboxylic acid anhydride group, or a polar group containing boron (e.g., a boronic acid group, a boronic ester group, a boronic acid anhydride group, or a boronate group), etc. In particular, it is preferable that thermoplastic resin has a hydroxyl group, an epoxy group or an acid anhydride group.

Furthermore, when the oxygen absorption resin composition of the present invention contains a suitable amount of the compatibilizer (D), the above-described effects can be obtained stably.

A preferable melt flow rate (MFR) (210° C., 2160 g load, according to JIS K7210) of the oxygen absorption resin composition of the present invention is 0.1 to 100 g/10 min, more preferably 0.5 to 50 g/10 min, and even more preferably 1 to 30 g/10 min. When the melt flow rate of the resin composition of the present invention fails to fall within the above range, the processability in melt-molding may become poor in many cases.

The components of the resin composition of the present invention are mixed and formed into a desired product. The process for mixing the components of the resin composition of the present invention is not limited to a particular method. The components can be mixed in any order. For example, when mixing the thermoplastic resin (A), the transition metal salt (B), the gas barrier resin (C) and the compatibilizer (D), they can be mixed simultaneously. Alternatively, the thermoplastic resin (A), the transition metal salt (B) and the compatibilizer (D) can be mixed, and then the mixture can be mixed with the gas barrier resin (C). Alternatively, the thermoplastic resin (A) and the compatibilizer (D) can be mixed, and then the mixture can be mixed with and the transition metal salt (B) and the gas barrier resin (C). The transition metal salt (B) and the gas barrier resin (C) can be mixed, and then the mixture can be mixed with the thermoplastic resin (A) and the compatibilizer (D). Alternatively, the thermoplastic resin (A), the gas barrier resin (C) and the compatibilizer (D) can be mixed, and then the mixture can be mixed with the transition metal salt (B). The transition metal salt (B) and the compatibilizer (D) can be mixed, and then the mixture can be mixed with the thermoplastic resin (A) and the gas barrier resin (C). Moreover, the mixture obtained by mixing the thermoplastic resin (A), the gas barrier resin (C) and the compatibilizer (D) can be mixed with the mixture obtained by mixing the transition metal salt (B) and the gas barrier resin (C).

As a specific method of mixing, melt-kneading is preferable because of the simplified process and the cost. In this case, it is preferable to use an apparatus with high kneading ability to allow the components to be finely and uniformly dispersed, because this can provide good oxygen absorption performance and good transparency, and can prevent gels and aggregates from being generated or mixed.

As the apparatus having a high kneading level, continuous kneaders such as a continuous intensive mixer and a kneading type twin screw extruder (co-rotation or counter-rotation), a mixing roll, and a Ko-kneader; batch kneaders such as a high-speed mixer, a Banbury mixer, an intensive mixer, or a pressure kneader; an apparatus using a rotary disk having a trituration mechanism such as a stone mill, for example, the KCK Kneading Extruder from KCK Co., Ltd.; a single screw extruder provided with a kneading section (e.g., Dulmage and CTM); and a simple kneader such as a ribbon blender and a Brabender mixer can be used. Among the above, continuous kneaders are preferable. Examples of commercially available continuous intensive mixers include FCM from Farrel Corp., CIM from The Japan Steel Works, Ltd., and KCM, LCM, and ACM from Kobe Steel, Ltd. It is preferable to employ an apparatus equipped with a single screw extruder downstream of such a kneader to perform kneading and extrusion pelletizing simultaneously. Also as a twin screw kneading extruder equipped with a kneading disk or a kneading rotor, for example, TEX from Japan Steel Works, Ltd., ZSK from Werner & Pfleiderer Corp., TEM from Toshiba Machine Co., Ltd., and PCM from Ikegai Tekko Co, Ltd. can be used. A single kneader may be used, or two or more kneaders may be coupled for use.

The kneading temperature is generally in the range of 50 to 300° C. It is preferable to perform extrusion at low temperatures with the hopper port sealed with nitrogen in order to prevent oxidation of the thermoplastic resin (A). A longer kneading period provides better results. However, considering the prevention of oxidation of the thermoplastic resin (A) and the production efficiency, the kneading time is generally 10 to 600 seconds, preferably 15 to 200 seconds, even more preferably 15 to 150 seconds.

The resin composition of the present invention can be molded into various molded products such as films, sheets, containers or other packaging materials by using various molding methods as appropriate. In this case, the resin composition of the present invention can be subjected to molding after being formed into pellets, or the components of the resin composition can be dry-blended, and subjected directly to molding.

With respect to molding methods and molded products, for example, the resin composition of the present invention can be molded into films, sheets, pipes and the like by melt extrusion molding, into containers by injection molding and into bottle-like hollow containers by blow molding. As the blow molding, it is preferable to employ extrusion blow molding where a parison is formed by extrusion molding and blown for obtaining a molded product, and injection blow molding where a preform is formed by injection molding and blown for obtaining a molded product.

In the present invention, the molded product produced by the above-described molding methods may be composed of a single layer, but it is preferable that the molded product is in the form of a multilayered structure obtained by laminating a layer of the resin composition of the present invention and other layers, in view of providing characteristics such as mechanical properties, water vapor barrier properties, and further oxygen barrier properties.

Examples of a layer structure of the multilayered structure include x/y, x/y/x, x/z/y, x/z/y/z/x, x/y/x/y/x, and x/z/y/z/x/y/z/x, where x denotes a layer made of a resin other than the resin composition of the present invention, y denotes the resin composition layer of the present invention, and z denotes an adhesive resin layer, but the structure is not limited to these structures. In the case where a plurality of x layers are provided, such layers may be made of the same kind of resin or of different kinds of resin. A recovered resin layer made of scraps generated by trimming during molding may be separately formed, or such recovered resin may be blended in a layer made of another resin. The thickness of the layers of the multilayered structure is not limited to a particular thickness, but the ratio of the thickness of the y layer to the total thickness of all the layers is preferably 2 to 20%, in view of the moldability, the cost or the like.

A thermoplastic resin is preferable as a resin used for the x layer in view of the processability or the like. Examples of such a thermoplastic resin include, but are not limited to, polyolefins such as polyethylene, polypropylene, ethylene-propylene copolymer, a copolymer including ethylene or propylene (e.g., a copolymer including ethylene or propylene and at least one of the following monomers as a copolymerized component: α-olefins such as 1-butene, isobutene, 4-methyl-1-pentene, 1-hexene, and 1-octene; unsaturated carboxylic acids such as itaconic acid, methacrylic acid, acrylic acid, and maleic anhydride, and their salts, their partial or complete esters, their nitriles, their amides, and their anhydrides; vinyl carboxylates such as vinyl formate, vinyl acetate, vinyl propionate, vinyl butylate, vinyl octanoate, vinyl dodecanoate, vinyl stearate, and vinyl arachidonate; vinylsilane compounds such as vinyltrimethoxysilane; unsaturated sulfonic acids and their salts; alkylthiols; vinyl pyrrolidones and the like), poly-4-methyl-1-pentene and poly-1-butene; polyesters such as polyethylene terephthalate, polybutylene terephthalate, and polyethylene naphthalate; polyamides such as poly ϵ-caprolactam, polyhexamethylene adipamide, and polymetaxylylene adipamide; polyvinylidene chloride, polyvinyl chloride, polystyrene, polyacrylonitrile, polycarbonate, and polyacrylate. Such a thermoplastic resin layer may be a non-oriented layer or a layer subjected to uniaxial or biaxial orientation or rolling.

Among these thermoplastic resins, polyolefins are preferable because of their excellent moisture-resistance, mechanical properties, economy, heat sealing properties and the like. Polyesters are preferable because of excellent mechanical properties, heat resistance or the like.

On the other hand, there is no limitation regarding the adhesive resin used for the z layer, and any adhesive resin can be used, as long as it can bind the layers to each other. For example, polyurethane or polyester one-component or two-component curing adhesives, and carboxylic acid-modified polyolefin resin are preferably used. The carboxylic acid-modified polyolefin resin is an olefin polymer or a copolymer containing an unsaturated carboxylic acid or an anhydrides thereof (e.g., maleic anhydride) as a copolymerized component or a graft copolymer obtained by grafting an unsaturated carboxylic acid or an anhydride thereof to an olefin polymer or copolymer.

Among these, a carboxylic acid-modified polyolefin resin is more preferable. In particular, when the x layer is a polyolefin resin, the adhesion with the y layer is good. Examples of such a carboxylic acid-modified polyolefin resin include a resin obtained by carboxylic acid modification of polyethylene (low density polyethylene (LDPE), linear low density polyethylene (LLDPE), or very low density polyethylene (VLDPE)), polypropylene, polypropylene copolymer; an ethylene-vinyl acetate copolymer, and ethylene-(meth)acrylate (for example, methyl acrylate or ethyl acrylate) copolymers.

Examples of the method for producing the multilayered structure include, but are not limited to, extrusion lamination, dry lamination, coinjection molding and coextrusion molding. The coextrusion molding includes coextrusion lamination, coextrusion sheet molding, blown film coextrusion, and coextrusion blow molding.

The sheet, film, parison and the like of the thus obtained multilayered structure may further be reheated at a temperature below the melting point of the contained resin and stretched uniaxially or biaxially by thermoforming such as draw forming, rolling, pantographic orientation, blown film orientation or extrusion blow molding, so that stretched molded products can be obtained.

The molded products using the multilayered structure can be used in various applications. In particular, when the multilayered structure is used as multilayered containers, the advantages provided by the multilayered structure are significantly prominent. Furthermore, a multilayered structure in which layers having high water vapor barrier properties are provided on both sides of a layer made of the resin composition of the present invention or on the side that becomes highly humid is preferable in that the retention period of the oxygen scavenging function of the multilayered structure is particularly prolonged, and as a result, very high gas barrier properties can be retained for a long time. On the other hand, a multilayered container having the resin composition layer as the innermost layer is preferable in that the oxygen scavenging function in the container can be exerted promptly.

Furthermore, the resin composition of the present invention exhibits good transparency by selecting an appropriate resin. Thus, such a composition is suitable for a packaging container whose content is clearly visible. Among such packaging containers, the following two embodiments of packaging containers satisfy a strict requirement for transparency and thus particularly receive a benefit from the resin composition of the present invention. One embodiment is a container composed of a multilayered film having a total thickness of 300 μm or less and including a layer made of the resin composition of the present invention. The other embodiment is a multilayered container including at least one layer made of the resin composition of the present invention and at least one thermoplastic polyester (PES) layer. These containers will be described below in this order.

The container composed of a multilayered film having a total thickness of 300 μm or less and including a layer made of the resin composition of the present invention is a flexible container composed of a multilayered structure having a relatively small total thickness and generally is processed into the form of a pouch or the like. This container has excellent gas barrier properties, and further has a continuous oxygen scavenging function, and the production is simple, so that this container is very useful for packaging of a product that is highly sensitive to oxygen and susceptible to degradation.

In a thin multilayered film having a total thickness of 300 μm or less, even if the transparency is deteriorated over time, the extent is small, and consequently the transparency of the multilayered film container can be maintained. The thickness of such a multilayered film is preferably 300 μm or less, more preferably 250 μm or less, and even more preferably 200 μm or less, to retain the good transparency and flexibility. On the other hand, in view of the mechanical strength as a container, the total thickness of all layers is preferably 10 μm or more, more preferably 20 μm or more, and even more preferably 30 μm or more.

When producing the multilayered container with a multilayered film having a total thickness of 300 μm or less, there is no particular limitation regarding the method for producing the multilayered film. For example, a multilayered film can be formed by laminating a layer of the resin composition of the present invention and a layer of another thermoplastic resin by techniques such as dry lamination or coextrusion lamination.

In the case of dry lamination, non-oriented films, uniaxially oriented films, biaxial oriented films, and rolled films can be used. Among these, a biaxially oriented polypropylene film, a biaxially oriented polyethylene terephthalate film and a biaxially oriented poly ε-caprolactam film are suitable because of their mechanical strength. The biaxially oriented polypropylene film is particularly preferable also in view of good moisture-resistance. When non-oriented films or uniaxially oriented films are used, the laminated film may further be re-heated and stretched uniaxially or biaxially by thermoforming such as draw forming, rolling, pantographic orientation, or blown film orientation, so that an oriented multilayered film can be formed.

In order to seal the obtained multilayered container, it is preferable to form a layer made of a heat-sealable resin on at least one outermost layer surface of the multilayered film in the process of producing the multilayered film. Examples of such resin include polyolefin such as polyethylene and polypropylene.

The thus obtained multilayered film can be processed into, for example, a bag shape and thus can be used as a packaging container to be filled with a material. Such a packaging container is flexible and convenient, and has good transparency and oxygen scavenging properties, so that it is very useful for packaging of materials that are susceptible to degradation in the presence of oxygen, especially for foods or the like.

The multilayered container including at least one layer made of the resin composition of the present invention and at least one layer made of the PES layer has good gas barrier properties, and excellent oxygen scavenging function. Furthermore, good transparency can be provided by selecting an appropriate resin. For this reason, this multilayered container can be used in various forms such as bag-like containers, cup-like containers, and hollow molded containers. Among these, this embodiment can be applied particularly well to hollow molded containers, especially bottles.

As the PES used for the multilayered container of the present invention including the layer made of the thermoplastic resin composition of the present invention and the PES layer, condensation polymers including aromatic dicarboxylic acids or alkyl esters thereof and diols as main components are used. In particular, PES including ethylene terephthalate as the main component is preferable in attaining the purpose of the present invention. More specifically, the total proportion (mol %) of a terephthalic acid unit and an ethylene glycol unit is preferably 70 mol % or more, and more preferably 90 mol % or more, of the total moles of all the structural units of the PES. If the total proportion of the terephthalic acid unit and the ethylene glycol unit is less than 70 mol %, the resultant PES is amorphous, so that the mechanical strength is insufficient. In addition, when the PES is stretched and formed into a container and the contents are hot-filled in the container, the thermal contraction is so large that it may not be put to practical use. Moreover, when solid-phase polymerization is carried out to reduce oligomers contained in the resin, the softened resin tends to stick, which makes production difficult. If necessary, the above PES may contain a bifunctional compound unit other than the terephthalic acid unit and the ethylene glycol unit. More specifically, the PES may contain a neopentylglycol unit, a cyclohexane dimethanol unit, a cyclohexane dicarboxylic acid unit, an isophthalic acid unit, a naphthalenedicarboxylic acid unit or the like in the range in which the above-described problems are not caused. There is no limitation regarding a method for producing such PES, and a known method can be selected as appropriate.

The method for producing the multilayered container of the present invention including at least one layer made of the resin composition and at least one PES layer is not specifically defined, but coinjection blow molding is preferred in view of productivity. In coinjection blow molding, the container is produced by subjecting a multilayered container precursor (i.e., a parison) obtained by coinjection molding to stretch blow molding.

In the coinjection molding, in general, the resins to constitute the layers of the multilayered structure are guided to concentric nozzles from two or more injection cylinders and are injected into a single mold simultaneously or alternately at non-synchronized timings, and one clamping operation is performed for molding. For example, parisons are produced by, but not limited to, the following methods: (1) PES layers for the inner and outer layers are first injected, then the resin composition for the sandwiched layer is injected, and thus a molded container of a three-layered structure of PES/resin composition/PES is obtained; and (2) PES layers for the inner and outer layers are first injected, then the resin composition is injected, and the PES layer is injected again simultaneously with the injection of the resin composition or thereafter so that a molded container of a five-layered structure of PES/resin composition/PES/resin composition/PES is obtained. Moreover, an adhesive resin layer may be disposed between the resin composition layer and the PES layer in the above layered structures, if necessary.

Regarding the conditions for injection molding, the PES is preferably injected at a temperature in the range of 250 to 330° C., more preferably 270 to 320° C., even more preferably 280 to 310° C. If the injection temperature for PES is lower than 250° C., the PES is not sufficiently melted, and the resulting molded products may contain non-molten substances (i.e., fisheyes), worsening the appearance, and moreover, causing the degradation of the mechanical strength of the molded products. In some extreme cases, the screw torque for the PES injection may increase, so that the molding machine may have operational malfunctions. If the injection temperature for PES exceeds 330° C., PES may be highly decomposed, which may lead to a lowered molecular weight, so that the mechanical strength of the molded products may be lowered. Moreover, the PES decomposition gives off some vapors of acetaldehyde and the like, and thus the properties of the materials filled in the molded products (e.g., molded containers) may be worsened. Moreover, the oligomers resulting from the PES decomposition may stain the mold significantly, and the resultant molded products may have a poor appearance.

The thermoplastic resin composition is preferably injected at a temperature in the range of 170 to 250° C., more preferably 180 to 240° C., and even more preferably 190 to 230° C. If the injection temperature for the resin composition is lower than 170° C., the resin composition does not melt sufficiently, and the resulting molded products may have non-molten substances (i.e., fisheyes), and thus their appearance may be worsened. In some extreme cases, the screw torque for the PES injection may increase, so that the molding machine may have operational malfunctions. On the other hand, if the injection temperature for the resin composition exceeds 250° C., oxidation of the thermoplastic resin (A) may proceed, so that the gas barrier properties and the oxygen scavenging function of the resin composition may be degraded. In addition, the molded products may be unfavorably colored and contain gelled materials, so that the appearance of the resulting molded products may be poor. Alternatively, the flow of the resin composition being injected will be disordered or blocked by vapors generated through decomposition of the resin composition and by the gelled materials, so that the layer of the resin composition may have failed areas. In some extreme cases, the gelled materials will make it impossible to continue the injection molding operation. In order to suppress the progress of the oxidation of the composition during melting, it is preferable to seal the supply hopper with nitrogen.

The resin composition of the present invention may be first formed into pellets by melt-blending raw material components, and then the pellets may be supplied to the molding machine. Alternatively, the components may be dry-blended, and then the dry blend may be fed to the molding machine.

The total thickness of the thus obtained parison is preferably in the range of 2 to 5 mm, and the total thickness of the resin composition layer or layers is preferably in the range of 10 to 500 μm in total.

The above-mentioned parison is directly in its high-temperature state, or after having been re-heated with a heating member such as a block heater, an infrared heater, or the like, transferred to the stretch blowing stage. In the stretch blowing stage, the heated parison is stretched one- to five-fold in the machine direction, and thereafter blown one- to four-fold with compressed air or the like so that the injection-blown molded multilayered container of the present invention can be produced. The temperature of the parison is preferably in the range of 75 to 150° C., more preferably 85 to 140° C., even more preferably 90 to 130° C., and most preferably 95 to 120° C. If the temperature of the parison exceeds 150° C., the PES easily crystallizes, so that the resultant container is whitened and its appearance may become poor. In addition, the delamination of the container will increase unfavorably. On the other hand, if the temperature of the parison is less than 75° C., the PES may be crazed to be pearly, so that the transparency of the resulting container may be lost.

The total thickness of the body part of the thus obtained multilayered container of the present invention generally is in the range of 100 to 2000 μm, preferably 150 to 1000 μm, and may vary depending on the use of the container. In this case, the total thickness of the resin composition layer is preferably in the range of 2 to 200 μM, more preferably 5 to 100 μm.

Thus, the multilayered containers including the layer made of the resin composition of the present invention and the PES layer are obtained. The containers may have good transparency and also have excellent gas barrier properties and oxygen scavenging function, and an odorous substance is not generated by oxygen absorption. The containers are therefore suitable for packaging materials susceptible to degradation in the presence of oxygen, such as foods and medicines. Especially, they can be used most suitably as containers for foods whose flavor is important or drinks such as beer.

Further, the resin composition of the present invention is suitably used for packing (e.g., gaskets) for containers, especially as gaskets for container caps. In this case, there is no particular limitations regarding the material of the cap body, and materials that are used generally in the art, for example, a thermoplastic resin and a metal can be used. The cap having a cap body provided with such a gasket has excellent gas barrier properties and a long-lasting oxygen scavenging function, and an odorous substance is not generated by oxygen absorption. Therefore, this cap is very useful as a cap used for containers of a product that is highly sensitive to oxygen and susceptible to degradation, foods whose flavor is particularly important, drinks or the like.

EXAMPLES

Hereinafter, the present invention will be described in more detail by way of examples, but the present invention is not limited thereto. In the following examples and comparative examples, analysis and evaluation were performed in the following manner.

(1) Molecular Structure of the Thermoplastic Resin (A)

The molecular structure was determined based on the spectrum obtained by $^1$H-NMR (nuclear magnetic resonance) measured using a deuterated chloroform as a solvent ("JNM-GX-500 Model" manufactured by JEOL Ltd. was used).

(2) Ethylene Content and the Degree of Saponification of EVOH:

The ethylene content and the degree of saponification of EVOH were calculated based on the spectrum obtained by $^1$H-NMR measured using a deuterated dimethyl sulfoxide as a solvent ("JNM-GX-500 Model" manufactured by JEOL Ltd. was used).

Synthesis Example 1

Synthesis of Epoxy Group-Containing Polybutadiene (A-2)

As a raw material, polybutadiene (polybutadiene rubber "Nipol BR1220" manufactured by ZEON CORPORATION; hereinafter this polybutadiene is referred to as polybutadiene (A-1)) was used. This resin had a number average molecular weight of 160000, and contained cis-polybutadiene, trans-polybutadiene and 1,2-polybutadine in a molar ratio of 96/2/2. The ratio of the carbon-carbon double bonds in its side chains to the total carbon-carbon double bonds was 2% (i.e., 100×b/(a+b)=2, where a (mol/g) is the amount of the carbon-carbon double bonds in its main chain and b (mol/g) is the amount of the carbon-carbon double bonds in the side chains).

To a 300 ml-separable flask provided with a condenser, a dropping funnel, a thermometer and a mechanical stirrer, 25 g of the polybutadiene (A-1), 250 g of cyclohexane and 0.32 g of trioctylmethylammonium chloride were added, and were dissolved completely therein while being stirred at 60° C. The resultant mixture was heated to 70° C., and an aqueous solution of pH 3.1 that was prepared by dissolving 0.15 g (0.05 mmol) of ammonium tungstate and 0.33 g (3.3 mmol) of phosphoric acid in 20 g of water was added thereto. Then, while the resultant mixture was stirred vigorously at 70° C., 5.21 g (0.046 mol) of a 30% hydrogen peroxide aqueous solution was added dropwise over 4 hours, and the mixture was further stirred for 2 hours. After stirring was stopped, the mixture was allowed to separate into an organic layer (i.e., a cyclohexane layer) and an aqueous layer at 60° C. The aqueous layer was removed, and the organic layer was washed with 100 ml of water, then washed with 100 ml of a 5% sodium carbonate aqueous solution, and further washed with 100 ml of water twice. Cyclohexane in the organic layer was removed by distillation under a reduced pressure and the resultant residue was dried at 80° C. and a pressure of 800 Pa for 8 hours to give an epoxy group-containing polybutadiene (A-2) (yield: 33.2 g) as a product. The product was analyzed with $^1$H-NMR. The conversion ratio of the double bonds i.e., ratio of consumed carbon-carbon double bonds) was 10%, the epoxidation ratio (i.e., epoxy group formation ratio based on the amount of the original carbon-carbon double bonds) was 9.85%, and thus, the selectivity ratio (i.e., epoxy group formation ratio based on the amount of the consumed carbon-carbon double bond) was 98.5%. The ratio of the carbon-carbon double bonds in the side chains to the total carbon-carbon double bonds of this polymer was 2%.

Synthesis Example 2

Synthesis of Hydroxyl Group-Containing Polybutadiene (A-3)

To a 300 ml-separable flask provided with a condenser, a dropping funnel, a thermometer and a mechanical stirrer, 25 g of the epoxy group-containing polybutadiene (A-2) that was obtained in Synthesis Example 1, 250 g of THF, and 10 g of 0.1% perchloric acid were added, and the mixture was stirred at 60° C. for 6 hours. After stirring was stopped, the reaction mixture was cooled to 25° C. and neutralized with 10 ml of a 5% ammonia aqueous solution. The resultant reaction mixture was added to 500 g of methanol, and a precipitated product was collected and dried at 80° C. and a pressure of 800 Pa for 8 hours. The obtained hydroxyl group-containing polybutadiene (A-3) (yield: 23.5 g) was analyzed with $^1$H-NMR. The conversion ratio of the epoxy group (i.e., ratio of consumed epoxy group) was 100%, the hydrolysis ratio (i.e., hydroxyl group formation ratio based on the amount of the consumed carbon-carbon double bond) was 98.5%, and thus, the selectivity ratio (i.e., hydroxyl group formation ratio based on the amount of the consumed epoxy group) was 100%. The ratio of the carbon-carbon double bonds in the side chains to the total carbon-carbon double bonds of this polymer was 2%.

Comparative Synthesis Example

Synthesis of Styrene-Isoprene-Styrene Block Copolymer (A-4)

First, 600 parts by volume of cyclohexane, 0.16 parts by volume of N,N,N',N'-tetramethylethylenediamine (TMEDA) and 0.094 parts by volume of n-butyl lithium as an initiator were placed in an autoclave equipped with a stirrer and previously purged with dry nitrogen. The temperature of the mixture in the autoclave was raised to 50° C., and 4.25 parts by volume of styrene monomer was fed thereto and was polymerized for 1.5 hours. Next, the temperature was reduced to 30° C., and 120 parts by volume of isoprene was fed thereto and polymerization reaction was carried out for 2.5 hours. Furthermore, the temperature was raised again to 50° C., and 4.25 parts by volume of styrene monomer was fed thereto, and polymerization reaction was carried out for 1.5 hours.

Then, 2-tert-butyl-6-(3-tert-butyl-2-hydroxy-5-methyl-benzyl)-4-methylphenyl acrylate and pentaerythritoltetrakis (3-laurylthiopropionate) as antioxidants were added to the resultant reaction mixture in an amount of 0.15 parts by weight each with respect to 100 parts by weight of the total amount of the styrene and isoprene. The reaction mixture was poured into methanol to precipitate a product, which was separated and dried. Thus, a styrene-isoprene-styrene triblock copolymer (A-4) to which the antioxidants were added was obtained.

The number average molecular weight of the thus obtained triblock copolymer was 85000. The molecular weight of each styrene block in the copolymer was 8500. The styrene content was 14 mol %. The ratio of the carbon-carbon double bonds in the side chains to the total carbon-carbon double bonds was 55%. The content of carbon-carbon double bonds in the obtained triblock copolymer was 0.014 eq/g, and the melt flow rate was 7.7 g/10 min. The resin included 0.12% by weight of 2-tert-butyl-6-(3-tert-butyl-2-hydroxy-5-methyl-benzy)-4-methylphenylacrylate and 0.12% by weight of pentaerythritoltetrakis(3-laurylthiopropionate).

Synthesis Example 3

Synthesis of Compatibilizer (D-1)

First, styrene-hydrogenated butadiene-styrene triblock copolymer was fed to a co-rotational twin screw extruder TEM-35B (manufactured by Toshiba Machine Co., Ltd.) at a rate of 7 kg/hour while purging the feeding port with nitrogen at a rate of 1 L/min. The styrene-hydrogenated butadiene-styrene triblock copolymer had the following physical properties: weight average molecular weight=100400; styrene/hydrogenated butadiene=18/82 (weight ratio); 1,2-bond/1,4-bond molar ratio in the butadiene units=47/53; hydrogenation ratio of the butadiene unit=97%, amount of double bond=430 μeq/g, melt index=5 g/10 minutes (230° C., 2160 g load); density=0.89 g/cm$^3$. Then, a mixture of borane-triethylamine complex (TEAB) and boric acid 1,3-butanediol ester (BBD) (weight ratio of TEAB/BBD=29/71) was supplied from a liquid feeder 1 at a rate of 0.6 kg/hour, and 1,3-butanediol was supplied from a liquid feeder 2 at a rate of 0.4 kg/hour, and continuously kneaded. During the kneading, the pressure was regulated such that the gauges at vent 0.1 and vent 2 indicated about 20 mmHg. As a result, a triblock copolymer (D-1) containing a boronic acid 1,3-butanediol ester group (BBDE) was obtained at a rate of 7 kg/hour from the discharge port. The amount of the boronic acid 1,3-butanediol ester group in the copolymer was 210 μeq/g.

The structure and the operation conditions of the twin screw extruder used for the reaction are as follows.

Screw diameter: 37 mmφ
L/D: 52 (15 blocks)
Liquid feeder: C3 (liquid feeder 1), C11 (liquid feeder 2)
Vent position: C6 (vent 1), C14 (vent 2)
Screw structure: Seal rings are used between C5 and C6, between C10 and C11 and at a position C12

| Temperature setting: | C1 | water-cooling |
|---|---|---|
| | C2 to C3 | 200° C. |
| | C4 to C15 | 250° C. |
| | die | 250° C. |
| Screw rotation: | 400 rpm | |

Example 1.1

First, 100 parts by weight of the above-described polybutadiene (A-1) and 0.8484 parts by weight of cobalt (II) stearate (0.0800 parts by weight in terms of cobalt atoms) were dry-blended, and the blend was melted and kneaded, using a roller mixer (LABO PLASTOMIL MODEL R100 manufactured by Toyo Seiki Seisakusho Ltd.) at a screw rotation of 60 rpm at 190° C. at a total resin amount of 70.59 g while purging the chamber with nitrogen, and the blend was taken out in bulk form after 5 minutes. The obtained bulky product was cut into pellets so that resin composition pellets made of polybutadiene (A-1) and cobalt (II) stearate were obtained.

The obtained resin composition pellets were supplied to a compression molding machine (manufactured by Shindo Metal Industries) and extruded at a temperature of 200° C. so that a sheet having a thickness of 100 μm was obtained. The obtained sheet was cut to obtain a sample sheet of about 0.1 g and the sheet was weighed precisely. Then, this sample sheet was rolled 5 hours after the sheet formation and placed in a standard bottle having an internal volume of 260 ml that was filled with 50% RH air of 23° C. The air in the standard bottle contained oxygen and nitrogen at a volume ratio of 21:79. Then, 5 ml of water was added to the standard bottle, and the opening of the standard bottle was sealed with a multilayered sheet including an aluminum layer using an epoxy resin, and was stored at 60° C. After the sealing, the inner air was sampled with a syringe periodically to measure the oxygen concentration of the air by gas chromatography. The small hole formed through the multilayered sheet during measurement was sealed with the epoxy resin every time the hole was formed. The oxygen decrease amount was calculated from the volume ratio of oxygen to nitrogen obtained by measurement, and thus, the oxygen absorption amount of the resin composition in a 100% RH atmosphere at 60° C. was obtained. FIG. 1 and Table 1.1 show the oxygen absorption amount (cumulative amount) of one day (24 hours), four days (96 hours), seven days (168 hours) and 14 days (336 hours) after the sealing. The oxygen absorption rate was calculated based on the results of 4 days after and 7 days after the start of the measurement, and the rate was 15.0 ml/(g·day). Table 1.1 shows the results.

Separately, the same sheet was cut to obtain a sample sheet of about 1 g and the sheet was weighed precisely. Then, this sample sheet was rolled 5 hours after the sheet formation and placed in a standard bottle having an internal volume of 85 ml that was filled with 50% RH air of 23° C. Then, 1 ml of water was added to the standard bottle, and the opening of the standard bottle was sealed with a multilayered sheet including an aluminum layer using an epoxy resin, and was stored at 60° C. for 2 weeks. Then, 10 ml of headspace gas of the bottle was sampled with a gas-tight syringe, and the gas was collected and concentrated in a TENAX-TA tube at −40° C. The collected gas was desorbed by rapid heating at 320° C. and introduced to GC/MS. The concentration and the introduction to GC/MS of the generated gas were performed, using a concentrating apparatus, Head Space Sampler JHS-100A.

The measurement conditions of GC/MS were as follows.
Heat desorption apparatus: Head Space Sampler JHS-100A (manufactured by Japan Analytical Industry Co., Ltd)
Desorption temperature: 320° C., 25 sec.
MS apparatus: mass spectrometer JMS SX102A (manufactured by JEOL Ltd.)
Data processing: data processing system MS-MP7000 (manufactured by JEOL Ltd.)
GC apparatus: HP5890 (manufactured by Hewlett Packard)
Carrier gas: helium 20 ml/min
Column: Pora PROT Q 25 m×0.32 mmID
Column temperature: 80° C. to 250° C. (temperature increase rate: 8° C./min)
Inlet temperature: 270° C.
Separator temperature: 270° C.

Acetone gas was collected in a vacuum collecting bottle, and diluted with nitrogen gas to prepare a standard gas (concentration: 4 μg/ml to 5 μg/ml). By using this standard gas, a calibration curve was prepared. This calibration curve was used for the calculation of each of the amounts of gases shown in Table 1.2. The weight of various gases generated and contained in the head space was converted to a gas weight per unit weight of the measurement sample based on the following equation, and the resultant value was taken as an amount of a generated gas (gas analysis value: unit ppm).

amount of gas generated (ppm=μg/g)=detected amount (μg)×(85/10)/1

85: volume (ml) of the sample bottle
10: volume of head space gas (ml)
1: total amount (g) of sample sheet
Table 1.2 shows the results of the gas analysis value.

Example 1.2

Resin composition pellets were obtained and a sheet was prepared so that the oxygen absorption amount was obtained in the same manner as in Example 1.1 except that the hydroxyl group-containing polybutadiene (A-3) obtained in Synthesis Example 2 was used as the thermoplastic resin (A). FIG. 1 and Table 1.1 show the results. The oxygen absorption rate calculated based on the results of 4 days after and 7 days after the start of the measurement was 13.3 ml/(g·day). Furthermore, analysis regarding the generated gas was performed in the same manner as in Example 1.1. Table 1.2 shows the results.

Example 1.3

Resin composition pellets were obtained and a sheet was prepared in the same manner as in Example 1.1 except that cis/trans-1,4 polybutadiene available from Scientific Polymer Products, INC. was used as the thermoplastic resin (A), instead of the polybutadiene (A-1). Using this sheet, analysis regarding a generated gas was performed in the same manner as in Example 1.1. Table 1.2 shows the results. In the cis/trans-1,4-polybutadiene available from Scientific Polymer Products, INC, the ratio of the carbon-carbon double bonds in the side chains to the total carbon-carbon double bonds was 9%.

Comparative Example 1

Resin composition pellets were obtained and a sheet was prepared so that the oxygen absorption amount was obtained in the same manner as in Example 1.1 except that the styrene-isoprene-styrene block copolymer (A-4) obtained in the comparative synthesis example was used as the thermoplastic resin (A). FIG. 1 and Table 1.1 show the results. The oxygen absorption rate calculated based on the results of 4 days after and 7 days after the start of the measurement was 8.7 ml/(g·day). Furthermore, analysis regarding the generated gas was performed in the same manner as in Example 1.1. Table 1.2 shows the results.

TABLE 1.1

| | Resin(A) | Oxygen absorption (ml/g) | | | | Oxygen absorption rate ml/(g · day) |
|---|---|---|---|---|---|---|
| | | 1 day | 4 days | 7 days | 14 days | |
| Example 1.1 | PBd | 114 | 151 | 196 | 228 | 15.0 |
| Example 1.2 | PBd-OH | 120 | 160 | 200 | 210 | 13.3 |
| Com. Ex. 1 | SIS | 99 | 153 | 179 | 202 | 8.7 |

PBd: Polybutadiene(A-1)
PBd-OH: Hydroxyl group containing polybutadiene (A-3)
SIS: Styrene-isoprene-styrene block copolymer (A-4)

TABLE 1.2

| Generated gas | Example 1.1 | Example 1.2 | Example 1.3 | Com. Ex. 1 |
|---|---|---|---|---|
| Acetone | 0.7 | 0.4 | 2.1 | 9.3 |
| Methyl ethyl ketone | 4.9 | 4.3 | 5.3 | 5.6 |
| Propionaldehyde | ND | ND | 0.3 | 0.7 |
| Furans | 4.9 | 3.2 | 8.0 | 10.9 |
| Propene | 0.2 | 0.4 | 0.5 | 0.8 |
| Butene | 0.5 | 1.2 | 0.6 | 4.2 |
| Cyclohexane | ND | ND | ND | 0.3 |
| Methylcyclobutane | ND | ND | ND | 0.5 |

Unit: ppm
ND: Not determined

Example 2.1

In Examples 2.1 to 2.5 and Comparative Example 2 below, EVOH having the following composition and properties (EVOH containing a phosphorus compound and a sodium salt; hereinafter referred to as "EVOH (C-1)") was used as the gas barrier resin (C).
Ethylene content: 32 mol %
Saponification degree: 99.6%
MFR: 3.1 g/10 minutes (210° C., 2160 g load)
Phosphoric acid content: 100 ppm (in terms of phosphoric acid radicals)
Sodium salt content: 65 ppm (in terms of sodium)
Melting point: 183° C.
Oxygen transmission rate: 0.4 ml·20 μm/(m²·day·atm) in 65% RH at 20° C.

First, 90 parts by weight of the above-described EVOH(C-1), 10 parts by weight of the polybutadiene (A-1) and 0.8484 parts by weight of cobalt (II) stearate (0.0800 parts by weight in terms of cobalt atoms) were dry-blended, and the blend was melted and kneaded, using a roller mixer (LABO PLASTOMIL MODEL R100 manufactured by Toyo Seiki Seisakusho Ltd.) at a screw rotation of 60 rpm at 200° C. at a total resin amount of 70.59 g while purging the chamber with nitrogen and taken out in a form of a bulk after 5 minutes. The obtained bulky product was cut into pellets so that resin composition pellets composed of EVOH(C-1), the polybutadiene (A-1) and cobalt (II) stearate were obtained.

The obtained resin composition pellets were supplied to a compression molding machine (manufactured by Shindo Metal Industries) and extruded at a temperature of 210° C. so that a sheet having a thickness of 100 μm was obtained. Observation of the cutting plane of the sheet through an electron microscope confirmed that the polybutadiene (A-1) was dispersed generally in the form of a particle having a size of about 1 to 5 μm in the matrix of the EVOH(C-1).

Figure 2:
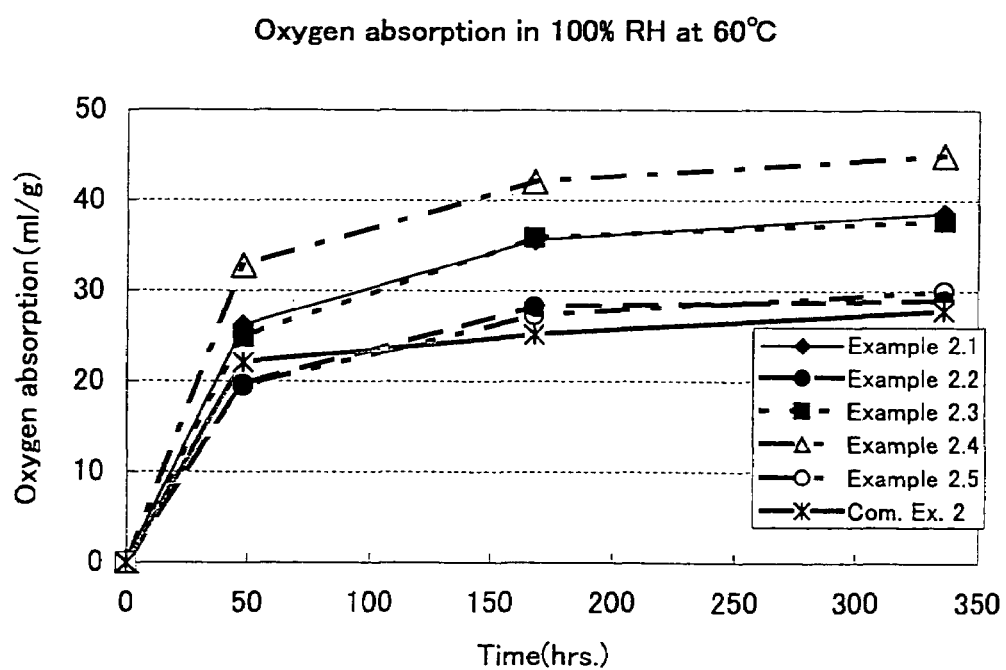
FIG. 2 is a graph in which the oxygen absorption amount of each of the sheets obtained in Examples 2.1 to 2.5 and Comparative Example 2 in a 100% RH atmosphere at 60° C. is plotted against time.

This sheet was cut to obtain a sample sheet of about 0.5 g and the sheet was weighed precisely. Then, this sample sheet was rolled and placed in a standard bottle, and was stored at 60° C. as in Example 1.1. Then, the oxygen amount was measured so as to obtain the oxygen absorption amount of the resin composition in a 100% RH atmosphere at 60° C. in the same manner as in Example 1.1. FIG. 2 and Table 2.1 show the results. When the oxygen absorption rate was calculated based on the results of 2 days after and 7 days after the start of the measurement, it was 1.9 ml/(g·day). Table 2.1 shows the results.

Figure 3:
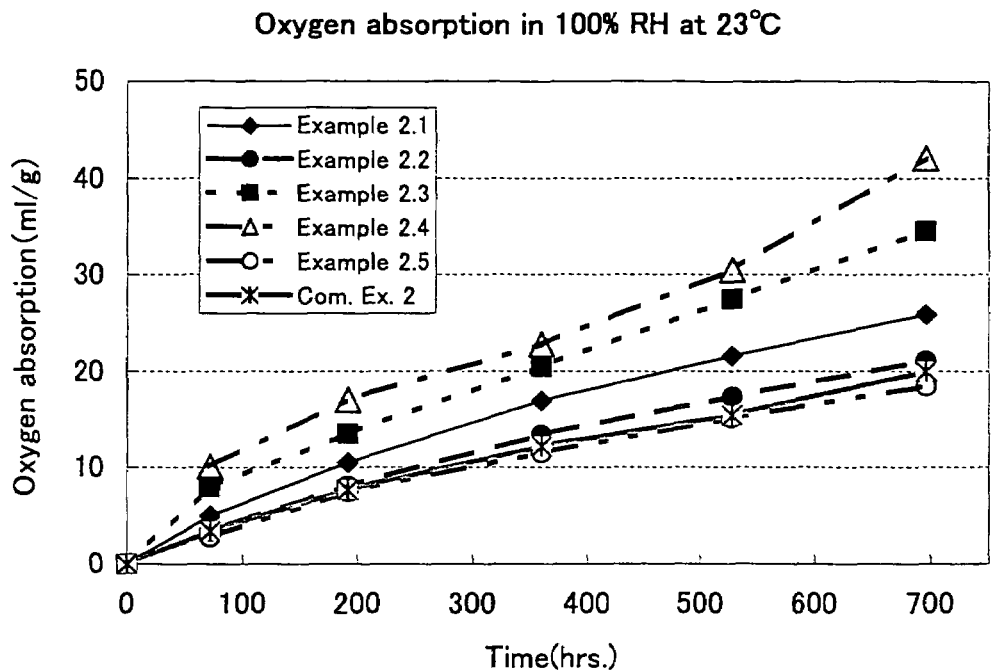
FIG. 3 is a graph in which the oxygen absorption amount of each of the sheets obtained in Examples 2.1 to 2.5 and Comparative Example 2 in a 100% RH atmosphere at 23° C. is plotted against time.

Next, Measurement was performed in the same manner as above except that the storage temperature was 23° C., and thus, the oxygen absorption amount of the resin composition in a 100% RH atmosphere at 23° C. was obtained. FIG. 3 and Table 2.2 show the results. When the oxygen absorption rate was calculated based on the results of 3 days after and 8 days after the start of the measurement, it was 1.1 ml/(g·day). Table 2.2 shows the results.

Example 2.2

A sheet made of a resin composition was obtained in the same manner as in Example 2.1 except that the epoxy group-containing polybutadiene (A-2) obtained in Synthesis Example 1 was used as the thermoplastic resin (A). Observation of the cutting plane of the sheet through an electron microscope confirmed that the epoxy group-containing polybutadiene (A-2) was dispersed generally in the form of a particle having a size of about 1 to 2 μm in the matrix of the EVOH(C-1). Then, the oxygen absorption amount of the resin composition was obtained in the same manner as in Example 2.1. FIGS. 2 and 3 and Tables 2.1 and 2.2 show the results. The oxygen absorption rate was obtained in the same manner as in Example 2.1. Tables 2.1 and 2.2 show the results.

Example 2.3

A sheet made of a resin composition was obtained in the same manner as in Example 2.1 except that the hydroxyl group-containing polybutadiene (A-3) was used as the thermoplastic resin (A). Observation of the cutting plane of the sheet through an electron microscope confirmed that that the hydroxyl group-containing polybutadiene (A-3) was dispersed generally in the form of a particle having a size of about 1 to 2 μm in the matrix of the EVOH (C-1). Then, the oxygen absorption amount of the resin composition was obtained in the same manner as in Example 2.1. FIGS. 2 and 3 and Tables 2.1 and 2.2 show the results. The oxygen absorption rate was obtained in the same manner as in Example 2.1. Tables 2.1 and 2.2 show the results.

Example 2.4

A sheet made of a resin composition was obtained in the same manner as in Example 2.1 except that polybutadiene (number average molecular amount: 45000, the ratio of carbon-carbon double bonds in its side chains to the total carbon-carbon double bonds: 5%, hereinafter, referred to as "polybutadiene (A-5)") was used as the thermoplastic resin (A). Observation of the cutting plane of the sheet through an electron microscope confirmed that the polybutadiene (A-5) was dispersed generally in the form of a particle having a size of about 1 to 2 μm in the matrix of the EVOH(C-1). Then, the oxygen absorption amount of the resin composition was obtained in the same manner as in Example 2.1. FIGS. 2 and 3 and Tables 2.1 and 2.2 show the results. The oxygen absorption rate was obtained in the same manner as in Example 2.1. Tables 2.1 and 2.2 show the results.

Example 2.5

A sheet made of a resin composition was obtained in the same manner as in Example 2.1 except that polybutadiene "Polyoil 130" (A-6) manufactured by ZEON CORPORATION (hereinafter, this polybutadiene is referred to as polybutadiene (A-6)) was used as the thermoplastic resin (A). Observation of the cutting plane of the sheet through an electron microscope confirmed that the polybutadiene (A-6) was dispersed generally in the form of a particle having a size of about 1 to 10 μm in the matrix of the EVOH(C-1). Then, the oxygen absorption amount of the resin composition was obtained in the same manner as in Example 2.1. FIGS. 2 and 3 and Tables 2.1 and 2.2 show the results. The oxygen absorption rate was obtained in the same manner as in Example 2.1. Tables 2.1 and 2.2 show the results. The above-mentioned polybutadiene (A-6) had a number average molecular amount of 3000 and a ratio of carbon-carbon double bonds in its side chains to the total carbon-carbon double bonds of 1%.

Comparative Example 2

A sheet made of a resin composition was obtained in the same manner as in Example 2.1 except that the above-described styrene-isoprene-styrene block copolymer (A-4) was used as the thermoplastic resin (A). Observation of the cutting plane of the sheet through an electron microscope confirmed that the styrene-isoprene-styrene block copolymer (A-4) was dispersed generally in the form of a particle having a size of about 1 to 2 μm in the matrix of the EVOH(C-1). Then, the oxygen absorption amount of the resin composition was obtained in the same manner as in Example 2.1. FIGS. 2 and 3 and Tables 2.1 and 2.2 show the results. The oxygen absorption rate was obtained in the same manner as in Example 2.1. Tables 2.1 and 2.2 show the results.

TABLE 2.1

| | Resin(A) | A/C*[1] (weight ratio) | Oxygen absorption (ml/g)*[2] | | | Oxygen absorption rate ml/(g · day) |
|---|---|---|---|---|---|---|
| | | | 2 days | 7 days | 14 days | |
| Example 2.1 | PBd(1) | 10/90 | 26.2 | 35.6 | 38.6 | 1.9 |
| Example 2.2 | Ep-PBd | 10/90 | 19.7 | 28.3 | 29.0 | 1.7 |
| Example 2.3 | PBd-OH | 10/90 | 24.9 | 35.9 | 37.7 | 2.2 |
| Example 2.4 | PBd(2) | 10/90 | 32.8 | 42.1 | 45.0 | 1.9 |
| Example 2.5 | PBd(3) | 10/90 | 19.5 | 27.3 | 30.0 | 1.6 |
| Com. Ex. 2 | SIS | 10/90 | 22.1 | 25.2 | 27.8 | 0.6 |

PBd(1): Polybutadiene (A-1)
Ep-PBd: Epoxy group-containing polybutadiene (A-2)
PBd-OH: Hydroxyl group-containing polybutadiene (A-3)
PBd(2): Polybutadiene (A-5)
PBd(3): Polybutadiene (A-6)
SIS: Styrene-isoprene-styrene block copolymer (A-4)
*[1]Weight ratio of thermoplastic resin (A) and gas barrier resin (C)
*[2]Oxygen absorption amount in 100% RH at 60° C.,

TABLE 2.2

| | Oxygen absorption (ml/g)*[1] | | | | | Oxygen absorption rate ml/(g · day) |
|---|---|---|---|---|---|---|
| | 3 days | 8 days | 15 days | 22 days | 29 days | |
| Example 2.1 | 5.0 | 10.5 | 16.9 | 21.6 | 25.9 | 1.1 |
| Example 2.2 | 3.4 | 8.1 | 13.4 | 17.3 | 21.1 | 0.9 |
| Example 2.3 | 8.0 | 13.5 | 20.5 | 27.5 | 34.5 | 1.1 |
| Example 2.4 | 10.1 | 17.0 | 22.8 | 30.5 | 42.1 | 1.4 |
| Example 2.5 | 2.8 | 7.5 | 11.5 | 15.1 | 18.4 | 0.9 |
| Com. Ex. 2 | 3.4 | 7.7 | 12.2 | 15.4 | 20.0 | 0.9 |

*[1]Oxygen absorption amount in 100% RH at 23° C.

Example 3.1

First, 95 parts by weight of EVOH(C-1), 5 parts by weight of polybutadiene (A-1) and 0.8484 parts by weight of cobalt (II) stearate (0.0800 parts by weight in terms of cobalt atoms) were dry-blended, and the blend was extruded into pellets using a 25 mm φ twin screw extruder (LABO PLASTOMIL MODEL 15C300 manufactured by Toyo Seiki Seisakusho Ltd.) at a screw rotation of 100 rpm at 210° C. at an extruded resin amount of 6 kg/hour. Then, the pellets were dried under a reduced pressure at 40° C. for 16 hours, and thus resin composition pellets composed of EVOH(C-1), polybutadiene (A-1) and cobalt (II) stearate were obtained.

The obtained resin composition pellets were subjected to extrusion molding at a temperature of 210° C. so that a film having a thickness of 20 μm was obtained. Observation of the cutting plane of the film through an electron microscope confirmed that the polybutadiene (A-1) was dispersed generally in the form of a particle having a size of about 1 to 5 μm in the matrix of the EVOH(C-1).

Figure 4:
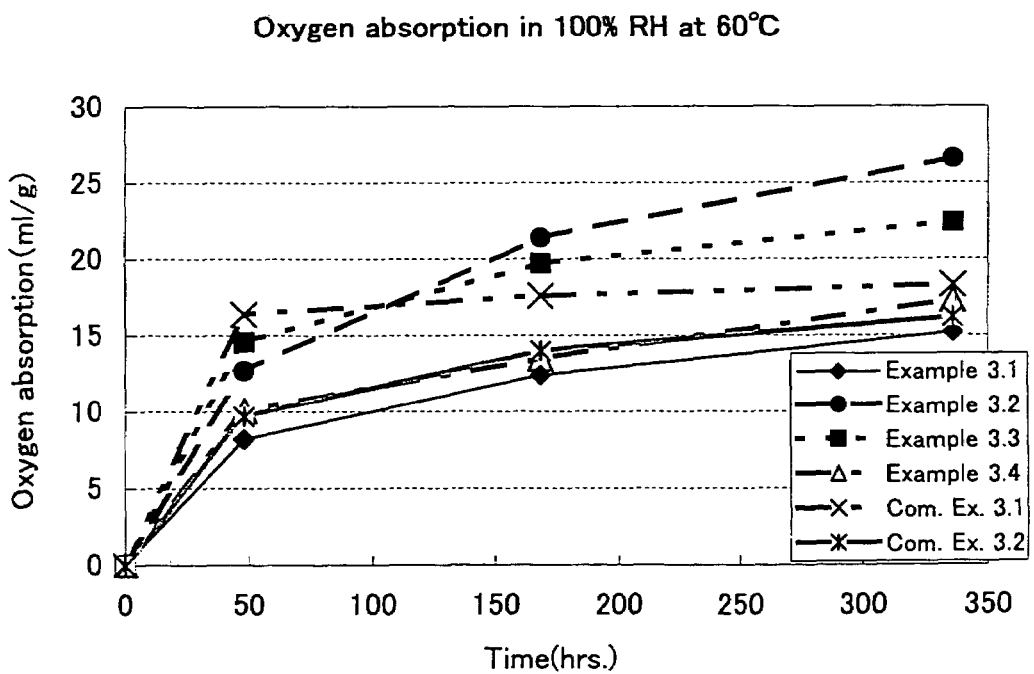
FIG. 4 is a graph in which the oxygen absorption amount of each of the films obtained in Examples 3.1 to 3.4 and Comparative Examples 3.1 and 3.2 in a 100% RH atmosphere at 60° C. is plotted against time.
Figure 5:
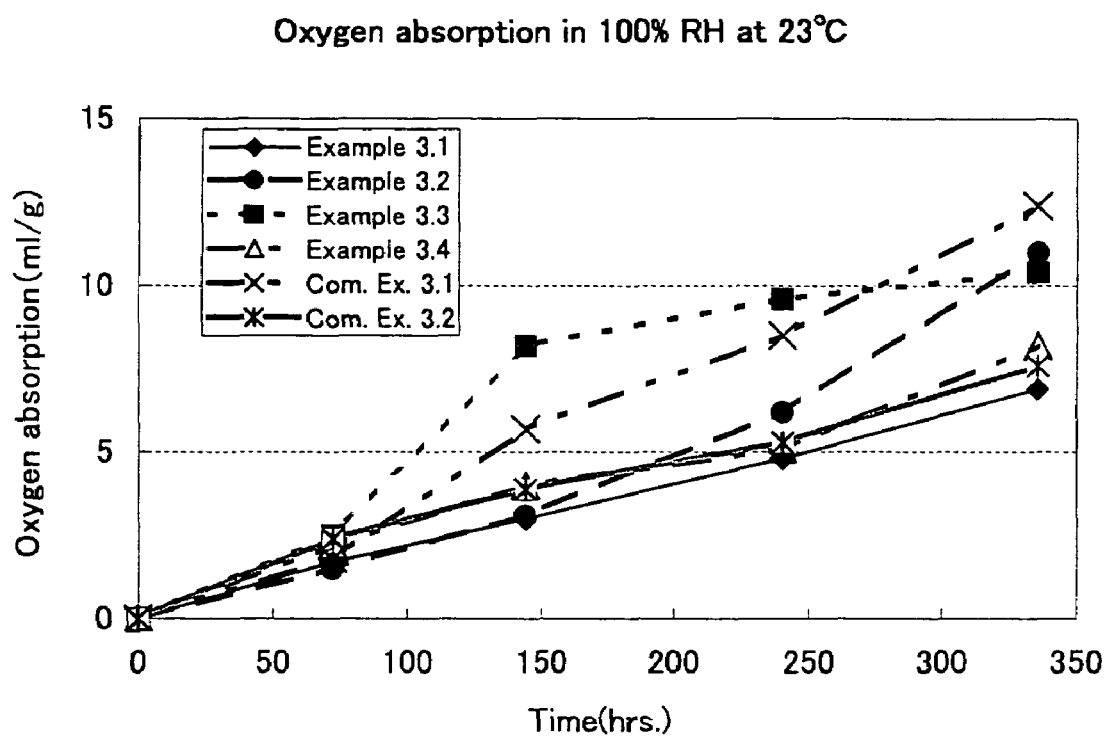
FIG. 5 is a graph in which the oxygen absorption amount of each of the films obtained in Examples 3.1 to 3.4 and Comparative Examples 3.1 and 3.2 in a 100% RH atmosphere at 23° C. is plotted against time.

Using this film, the oxygen absorption amount of the resultant resin composition was obtained in the same manner as in Example 2.1. FIGS. 4 and 5 and Tables 3.1 and 3.2 show the results. Furthermore, the oxygen absorption rate was calculated in the same manner as in Example 2.1. The oxygen absorption rate in a 100% RH atmosphere at 23° C. was calculated based on the results of 3 days after and 6 days after the start of the measurement. Tables 3.1 and 3.2 show the results. Furthermore, the odor evaluation was performed in the manner described below.

Odor Evaluation

The film was cut to obtain a sample film of about 1 g and the film was weighed precisely. Then, this sample film was rolled 5 hours after the film formation and placed in a standard bottle having an internal volume of 85 ml that was filled with 50% RH air at 23° C. Then, 1 ml of water was added to the standard bottle, and the opening of the standard bottle was sealed with a multilayered film including an aluminum layer using an epoxy resin, and was stored at 60° C. for two weeks. Thereafter, the odor of headspace gas of the samples was subjected to sensory evaluation by 5 test persons.

Each of the 5 test persons evaluated that almost no odor present in the headspace gas. The results was shown in Table 3.2, in which ⊚ indicates that almost no odor present in the headspace gas.

Example 3.2

First, resin composition pellets were obtained in the same manner as in Example 3.1 except that 90 parts by weight of EVOH(C-1), 10 parts by weight of polybutadiene (A-1) and 0.8484 parts by weight of cobalt (II) stearate were used, and the resultant pellets were subjected to extrusion molding so that a film was obtained. Observation of the cutting plane of the film through an electron microscope confirmed that the polybutadiene (A-1) was dispersed generally in the form of a particle having a size of about 1 to 5 μm in the matrix of the EVOH(C-1).

Using this film, the oxygen absorption amount of the resultant resin composition was obtained in the same manner as in Example 3.1. FIGS. 4 and 5 and Tables 3.1 and 3.2 show the results. Furthermore, the oxygen absorption rate was calculated in the same manner as in Example 3.1. Tables 3.1 and 3.2 show the results. Furthermore, the odor evaluation was performed in the same manner as in Example 3.1. Each of the 5 test persons evaluated that almost no odor present in the headspace gas. Table 3.2 shows the results.

Example 3.3

First, resin composition pellets were obtained in the same manner as in Example 3.1 except that 93 parts by weight of EVOH(C-1), 5 parts by weight of polybutadiene (A-1), 2 parts by weight of the compatibilizer (D-1) and 0.8484 parts by weight of cobalt (II) stearate were used, and was extrusion-molded so that a film was obtained. Observation of the cutting plane of the film through an electron microscope confirmed that the polybutadiene (A-1) was dispersed generally in the form of a particle having a size of about 1 to 2 μm in the matrix of the EVOH(C-1).

Using this film, the oxygen absorption amount of the resultant resin composition was obtained in the same manner as in Example 3.1. FIGS. 4 and 5 and Tables 3.1 and 3.2 show the results. Furthermore, the oxygen absorption rate was calculated in the same manner as in Example 3.1. Tables 3.1 and 3.2 show the results. Furthermore, the odor evaluation was performed in the same manner as in Example 3.1. Each of the 5 test persons evaluated that almost no odor present in the headspace gas. Table 3.2 shows the results.

Example 3.4

First, resin composition pellets were obtained in the same manner as in Example 3.1 except that a polyethylene resin "Mirason 11" (C-2) manufactured by Mitsui Chemicals, Inc. was used instead of the EVOH (C-1), and was extrusion-molded so that a film was obtained. Observation of the cutting plane of the film through an electron microscope confirmed that the polybutadiene (A-1) was dispersed generally in the form of a particle having a size of about 1 to 5 μm in the matrix of the polyethylene resin (C1).

Using this film, the oxygen absorption amount of the resultant resin composition was obtained in the same manner as in Example 3.1. FIGS. 4 and 5 and Tables 3.1 and 3.2 show the results. Furthermore, the oxygen absorption rate was calculated in the same manner as in Example 3.1. Tables 3.1 and 3.2 show the results. Furthermore, the odor evaluation was performed in the same manner as in Example 3.1. Each of the 5 test persons evaluated that odor present in lower level in the headspace gas. The results was shown in Table 3.2, in which ○ indicates that odor present in lower level in the headspace gas. Table 3.2 shows the results.

Comparative Example 3.1

First, resin composition pellets were obtained in the same manner as in Example 3.1 except that styrene-isoprene-styrene block copolymer (A-4) was used as the thermoplastic resin (A), and the pellets were subjected to extrusion molding so that a film was obtained. Observation of the cutting plane of the film through an electron microscope confirmed that the copolymer (A-4) was dispersed generally in the form of a particle having a size of about 1 to 2 μm in the matrix of the EVOH(C-1).

Using this film, the oxygen absorption amount of the resultant resin composition was obtained in the same manner as in Example 3.1. FIGS. 4 and 5 and Tables 3.1 and 3.2 show the results. Furthermore, the oxygen absorption rate was calculated in the same manner as in Example 3.1. Tables 3.1 and 3.2 show the results. Furthermore, the odor evaluation was performed in the same manner as in Example 3.1. Each of the 5 test persons evaluated that disagreeable odor present in the headspace gas. The results was shown in Table 3.2, in which x indicates that disagreeable odor present in the headspace gas. Table 3.2 shows the results.

Comparative Example 3.2

First, resin composition pellets were obtained in the same manner as in Example 3.1 except that mix-polybutadiene ("Nipol BR1242" manufactured by ZEON CORPORATION, 1,4-butadine/1,2-butadine=87.5/12.5; hereinafter referred to "polybutadiene (A-7)") was used as the thermoplastic resin (A), and the pellets were subjected to extrusion molding so that a film was obtained. Observation of the cutting plane of the film through an electron microscope confirmed that the polybutadiene (A-7) was dispersed generally in the form of a particle having a size of about 1 to 5 μm in the matrix of the EVOH(C-1).

Using this film, the oxygen absorption amount of the resultant resin composition was obtained in the same manner as in Example 3.1. FIGS. 4 and 5 and Tables 3.1 and 3.2 show the results. Furthermore, the oxygen absorption rate was calculated in the same manner as in Example 3.1. Tables 3.1 and 3.2 show the results. Furthermore, the odor evaluation was performed in the same manner as in Example 3.1. Each of the 5 test persons evaluated that odor present in the headspace gas. The results was shown in Table 3.2, in which Δ indicates that odor present in the headspace gas. Table 3.2 shows the results.

TABLE 3.1

|  | Compatibilizer | | A/C/D/E*1 | Oxygen absorption (ml/g)*2 | | | Oxygen absorption rate |
|---|---|---|---|---|---|---|---|
|  | Resin(A) | (D) | Resin(E) (weight ratio) | 2 days | 7 days | 14 days | ml/(g · day) |
| Example 3.1 | PBd | — |  5/95/0/0 | 8.2 | 12.4 | 15.2 | 0.8 |
| Example 3.2 | PBd | — | 10/90/0/0 | 12.7 | 21.4 | 26.6 | 1.7 |
| Example 3.3 | PBd | D-1 | 5/93/2/0 | 14.6 | 19.7 | 22.4 | 1.0 |
| Example 3.4 | PBd | — | PE 5/0/0/95 | 10.1 | 13.5 | 17.3 | 0.7 |
| Com. Ex. 3.1 | SIS | — | 5/95/0/0 | 16.4 | 17.6 | 18.3 | 0.2 |
| Com. Ex. 3.2 | mix-PBd | — | 5/95/0/0 | 9.7 | 14.0 | 16.2 | 0.9 |

PBd: Polybutadiene (A-1)
SIS: Styrene-isoprene-styrene block copolymer (A-4)
mix-PBd: Polybutadiene (A-7)
*1Weight ratio of thermoplastic resin (A), gas barrier resin (C), compatibilizer (D), and other resin (E)
*2Oxygen absorption amount in 100% RH at 60° C.

TABLE 3.2

|  | Oxygen absorption (ml/g)*1 | | | | Oxygen absorption rate ml/(g · day) | Odor evaluation |
|---|---|---|---|---|---|---|
|  | 3 days | 6 days | 10 days | 14 days | | |
| Example 3.1 | 1.7 | 3.0 | 4.8 | 6.9 | 0.4 | ◎ |
| Example 3.2 | 1.5 | 3.1 | 6.2 | 11.0 | 0.5 | ◎ |
| Example 3.3 | 2.5 | 8.2 | 9.6 | 10.4 | 1.9 | ◎ |
| Example 3.4 | 2.2 | 4.0 | 5.1 | 8.2 | 0.6 | ○ |
| Com. Ex. 3.1 | 1.8 | 5.7 | 8.5 | 12.4 | 1.3 | X |
| Com. Ex. 3.2 | 2.4 | 3.9 | 5.3 | 7.6 | 0.5 | Δ |

*1Oxygen absorption amount in 100% RH at 23° C.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An oxygen absorption resin composition comprising a thermoplastic resin (A) having carbon-carbon double bonds substantially in its main chain, a transition metal salt (B), and a gas barrier resin (C),
    wherein the thermoplastic resin (A) satisfies the following inequality (1):

$$100 \times b/(a+b) \leq X \quad (1)$$

wherein a (mol/g) is an amount of carbon carbon double bonds in its main chain, b (mol/g) is an amount of carbon-carbon double bonds in its side chain, and X is 10, and
    wherein the gas barrier resin (C) is a polyvinyl alcohol resin having an oxygen transmission rate of 20 ml·20 μm/(m²·day·atm) or less in 65% RH at 20° C.;
    wherein the thermoplastic resin (A) is polybutadiene.

2. The oxygen absorption resin composition of claim 1, wherein the thermoplastic resin (A) satisfies the following inequality (1): $100 \times b/(a+b) \leq X$ (1) wherein a (mol/g) is an amount of the carbon-carbon double bonds in its main chain, and b (mol/g) is an amount of the carbon-carbon double bonds in its side chain, and X is 7.

3. The oxygen absorption resin composition of claim 1, wherein the thermoplastic resin (A) comprises at least one of the units represented by formula (I) and formula (II):

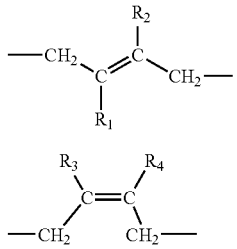

wherein $R_1$, $R_2$, $R_3$ and $R_4$ are the same or different, a hydrogen atom, an alkyl group that may be substituted, an aryl group that may be substituted, an alkylaryl group that may be substituted, —$COOR_5$, —$OCOR_6$, a cyano group or a halogen atom, and $R_3$ and $R_4$ may together form a ring via a methylene group or an oxymethylene group, where $R_5$ and $R_6$ are an alkyl group that may be substituted, an aryl group that may be substituted or an alkylaryl group that may be substituted.

4. The oxygen absorption resin composition of claim 1, wherein the thermoplastic resin (A) comprises at least one of the units represented by formula (I) and formula (II):

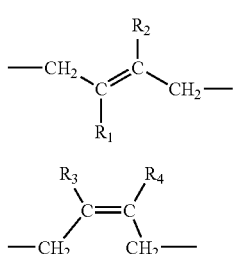

wherein $R_1$, $R_2$, $R_3$ and $R_4$ are hydrogen atoms.

5. The oxygen absorption resin composition of claim 1, wherein the transition metal salt (B) is at least one metal salt selected from the group consisting of an iron salt, a nickel salt, a copper salt, a manganese salt and a cobalt salt.

6. The oxygen absorption resin composition of claim 1, wherein the oxygen absorption rate is at least 0.01 ml/(g·day).

7. The oxygen absorption resin composition of claim 1, wherein the gas barrier resin (C) is an ethylene-vinyl alcohol copolymer having an ethylene content of 5 to 60 mol % and a saponification degree of 90% or more.

8. The oxygen absorption resin composition of claim 1, wherein the gas barrier resin (C) is contained in an amount of 70 to 99 wt % and the thermoplastic resin (A) is contained in an amount of 30 to 1 wt %, when the total weight of the thermoplastic resin (A) and the gas barrier resin (C) is determined to be 100 wt %.

9. The oxygen absorption resin composition of claim 1, further comprising a compatibilizer (D).

10. The oxygen absorption resin composition of claim 9, wherein the gas barrier resin (C) is contained in an amount of 70 to 98.9 wt %, the thermoplastic resin (A) is contained in an amount of 29.9 to 1 wt %, and the compatibilizer (D) is contained in an amount of 29 to 0.1 wt %, when the total weight of the thermoplastic resin (A), the gas barrier resin (C) and the compatibilizer (D) is determined to be 100 wt %.

11. The oxygen absorption resin composition of claim 1, wherein particles of the thermoplastic resin (A) are dispersed in a matrix of the gas barrier resin (C).

12. A molded product comprising the oxygen absorption resin composition of claim 1.

13. A multilayered structure comprising a layer made of the oxygen absorption resin composition of claim 1.

14. A multilayered container comprising a layer made of the oxygen absorption resin composition of claim 1.

15. A multilayered container made of a multilayered film having a total layer thickness of 300 μm or less, wherein the multilayered film comprises a layer made of the oxygen absorption resin composition of claim 1.

16. A multilayered container comprising a layer made of the oxygen absorption resin composition of claim 1 and a thermoplastic polyester layer.

17. A cap having a cap body that is provided with a gasket made of the oxygen absorption resin composition of claim 1.

* * * * *

UNITED STATES PATENT AND TRADEMARK OFFICE
CERTIFICATE OF CORRECTION

| | | |
|---|---|---|
| PATENT NO. | : 7,608,340 B2 | Page 1 of 1 |
| APPLICATION NO. | : 10/997867 | |
| DATED | : October 27, 2009 | |
| INVENTOR(S) | : Tsuji et al. | |

It is certified that error appears in the above-identified patent and that said Letters Patent is hereby corrected as shown below:

On the cover page,

Item [*] Notice: Subject to any disclaimer, the term of this patent is extended or adjusted under 35 USC 154(b) by (76) days Delete the phrase "by 76 days" and insert -- by 129 days --

Signed and Sealed this

Twentieth Day of April, 2010

David J. Kappos
*Director of the United States Patent and Trademark Office*